United States Patent
Honarvar et al.

(10) Patent No.: US 6,609,120 B1
(45) Date of Patent: *Aug. 19, 2003

(54) DECISION MANAGEMENT SYSTEM WHICH AUTOMATICALLY SEARCHES FOR STRATEGY COMPONENTS IN A STRATEGY

(75) Inventors: Laurence Honarvar, Arnold, MD (US); Steven Fatigante, San Francisco, CA (US); Blake Payne, Arlington, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,476

(22) Filed: Jun. 18, 1999

Related U.S. Application Data

(63) Continuation-in-part of application No. 09/217,016, filed on Dec. 21, 1998, now Pat. No. 6,430,545.
(60) Provisional application No. 60/076,910, filed on Mar. 5, 1998.

(51) Int. Cl.[7] ................... G06F 17/30; G06F 15/46
(52) U.S. Cl. ................................. 707/3; 705/8
(58) Field of Search .................. 705/7–10, 35; 707/2–5, 100, 103; 703/4–6; 709/246; 706/45, 46, 52, 60

(56) References Cited

U.S. PATENT DOCUMENTS

| | | | |
|---|---|---|---|
| 5,177,684 A | 1/1993 | Harker et al. ........ 364/436 |
| 5,182,793 A | 1/1993 | Alexander et al. ........ 395/13 |
| 5,404,292 A | 4/1995 | Hendrickson ........ 364/413.02 |
| 5,406,477 A | * 4/1995 | Harhen ........ 703/6 |
| 5,481,647 A | 1/1996 | Brody et al. ........ 395/51 |
| 5,517,405 A | 5/1996 | McAndrew et al. ........ 364/401 |
| 5,537,590 A | * 7/1996 | Amado ........ 707/2 |
| 5,630,127 A | 5/1997 | Moore et al. ........ 395/615 |
| 5,649,116 A | 7/1997 | McCoy et al. ........ 395/238 |
| 5,687,322 A | 11/1997 | Deaton et al. ........ 395/214 |

(List continued on next page.)

FOREIGN PATENT DOCUMENTS

| | | | |
|---|---|---|---|
| EP | 0 205 873 A2 | 12/1986 | ........ G06F/9/44 |
| EP | 0 230 349 A2 | 7/1987 | ........ G06F/9/44 |
| EP | 0 762 306 A2 | 3/1997 | ........ G06F/17/60 |
| EP | 0 849 693 A2 | 6/1998 | ........ G06F/17/60 |
| EP | 0 915 422 A1 | 5/1999 | ........ G06F/11/22 |
| EP | 1 035 485 A2 | 9/2000 | ........ G06F/17/60 |
| EP | 1 073 249 A2 | 1/2001 | ........ H04M/7/00 |
| EP | 1 102 187 A2 | 5/2001 | ........ G06F/17/60 |
| EP | 1 139 257 A1 | 10/2001 | ........ G06F/17/60 |
| WO | WO 97/09666 | 3/1997 | |

(List continued on next page.)

*Primary Examiner*—Safet Metjahic
*Assistant Examiner*—Te Yu Chen
(74) *Attorney, Agent, or Firm*—Staas & Halsey LLP

(57) ABSTRACT

A computer-implemented, software based, decision management system which automatically searches for a respective strategy component through a strategy to identify where the strategy component is being used in the strategy, and to determine the strategy component's inter-relationships in the strategy. For example, an end user of the system selects a respective strategy component to be searched. A plurality of selectable inquiries are then automatically presented to the end user, where the plurality of selectable inquiries are context sensitive to correspond to the selected strategy component. The end user then selects a respective inquiry. Then, the system automatically searches for the selected strategy component through the strategy in accordance with the selected inquiry to identify where the strategy component is being used in the strategy. The strategy can be searched, for example, by analyzing linked tables of a relational data model for implementing the strategy.

36 Claims, 27 Drawing Sheets

U.S. PATENT DOCUMENTS

| | | | | |
|---|---|---|---|---|
| 5,696,907 A | | 12/1997 | Tom | 395/238 |
| 5,706,406 A | | 1/1998 | Pollock | 395/55 |
| 5,875,236 A | | 2/1999 | Jankowitz et al. | 379/114 |
| 5,930,762 A | * | 7/1999 | Masch | 705/7 |
| 5,930,764 A | | 7/1999 | Melchione et al. | 705/10 |
| 5,940,816 A | | 8/1999 | Fuhrer et al. | 706/13 |
| 5,953,704 A | | 9/1999 | McIlroy et al. | 705/2 |
| 6,009,420 A | | 12/1999 | Fagg, III et al. | 706/45 |
| 6,012,051 A | | 1/2000 | Sammon, Jr. et al. | 706/52 |
| 6,014,661 A | * | 1/2000 | Ahlberg et al. | 707/3 |
| 6,016,477 A | | 1/2000 | Ehnebuske et al. | 705/7 |
| 6,018,718 A | | 1/2000 | Walker et al. | 705/14 |
| 6,021,397 A | | 2/2000 | Jones et al. | 705/36 |
| 6,029,138 A | | 2/2000 | Khorasani et al. | 705/2 |
| 6,029,149 A | | 2/2000 | Dykstra et al. | 705/38 |
| 6,029,153 A | | 2/2000 | Bauchner et al. | 705/42 |
| 6,115,691 A | | 9/2000 | Ulwick | 705/7 |
| 6,119,103 A | | 9/2000 | Basch et al. | 705/35 |
| 6,125,359 A | | 9/2000 | Lautzenheiser et al. | 706/60 |
| 6,128,599 A | | 10/2000 | Walker et al. | 705/14 |
| 6,151,565 A | | 11/2000 | Lobley et al. | 703/2 |
| 6,151,582 A | * | 11/2000 | Huang et al. | 705/8 |
| 6,163,604 A | | 12/2000 | Baulier et al. | 379/189 |
| 6,182,060 B1 | | 1/2001 | Hedgcock et al. | 707/1 |
| 6,188,988 B1 | | 2/2001 | Barry et al. | 705/3 |
| 6,236,975 B1 | | 5/2001 | Boe et al. | 705/7 |
| 6,249,775 B1 | | 6/2001 | Freeman et al. | 705/36 |
| 6,275,818 B1 | | 8/2001 | Subramanian et al. | 707/2 |
| 6,286,005 B1 | | 9/2001 | Cannon | 707/100 |
| 6,292,787 B1 | | 9/2001 | Scott et al. | 705/36 |

FOREIGN PATENT DOCUMENTS

| | | | |
|---|---|---|---|
| WO | WO 97/29447 | 8/1997 | G06F/19/00 |
| WO | WO 97/34246 | 9/1997 | G06F/17/60 |
| WO | WO 98/49641 | 11/1998 | G06F/17/60 |
| WO | WO 98/49642 | 11/1998 | G06F/17/60 |
| WO | WO 98/54667 | 12/1998 | G06F/17/60 |
| WO | WO 99/09503 | 2/1999 | G06F/17/60 |
| WO | WO 99/13427 | 3/1999 | G06K/7/00 |
| WO | WO 99/39290 | 8/1999 | G06F/17/60 |
| WO | WO 00/34910 | 6/2000 | G06F/17/60 |
| WO | WO 00/34911 | 6/2000 | G06F/17/60 |
| WO | WO 00/54186 | 9/2000 | G06F/17/30 |
| WO | WO 00/57312 | 9/2000 | G06F/17/30 |
| WO | WO 00/65502 | 11/2000 | G06F/17/60 |
| WO | WO 00/72268 A1 | 11/2000 | G06T/11/20 |
| WO | WO 01/16851 A2 | 3/2001 | G06F/17/60 |
| WO | WO 01/39090 A1 | 5/2001 | G06F/17/60 |
| WO | WO 01/39589 A2 | 6/2001 | |
| WO | WO 01/45012 A2 | 6/2001 | G06F/17/60 |
| WO | WO 01/46876 A2 | 6/2001 | G06F/17/60 |
| WO | WO 01/50306 A2 | 7/2001 | G06F/17/00 |
| WO | WO 01/50336 A1 | 7/2001 | G06F/17/27 |
| WO | WO 01/57756 A1 | 8/2001 | G06F/17/60 |
| WO | WO 01/61598 A1 | 8/2001 | G06F/17/60 |
| WO | WO 01/75754 A1 | 10/2001 | G06F/17/60 |

* cited by examiner

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 6
(PRIOR ART)

| CLASS | TYPE | SEQ_NUM | SEARCH_MENU_ITEM | RESULT_TEXT |
|---|---|---|---|---|
| F | D | 1 | WHICH TREES UTILIZE THIS DECISION? | DECISION TREES UTILIZING DECISION... |
| F | D | 2 | WHICH FUNCTIONS DOES THIS DECISION CALL? | FUNCTIONS CALLED BY DECISION... |

FIG. 12(B)

| ATTRIBUTES TABLE |
| --- |
| ATTR_ID |
| CLASS |
| TYPE |
|  |

FIG. 14(A)

DECISION MANAGEMENT SYSTEM WHICH AUTOMATICALLY SEARCHES FOR STRATEGY COMPONENTS IN A STRATEGY

CROSS-REFERENCE TO RELATED APPLICATIONS

This application is related to, is a continuation-in-part (CIP) of, and claims the benefit of, U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, now U.S. Pat. No. 6,430,545, and which is incorporated herein by reference.

This application claims the benefit of provisional application No. 60/076,910, filed Mar. 5, 1998, now abandoned.

This application is related to, and claims the benefit of, U.S. application titled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, now U.S. Pat. No. 6,321,206, and which is incorporated herein by reference.

This application is related to, and claims the benefit of, U.S. application titled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, and which is incorporated herein by reference.

This application is related to, and claims the benefit of, U.S. application titled VERSIONING IN A RULES BASED DECISION MANAGEMENT SYSTEM, U.S. Ser. No. 09/219,341, filed Dec. 23, 1998, and which is incorporated herein by reference.

This application is related to, and claims the benefit of, U.S. application titled PARAMETER HIERARCHY FOR A DECISION MANAGEMENT SYSTEM, U.S. Ser. No. 09/219,340, filed Dec. 23, 1998, and which is incorporated herein by reference.

This application is related to, and claims the benefit of, U.S. application titled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, and which is incorporated herein by reference.

This application is related to, and claims the benefit of, U.S. application titled DECISION MANAGEMENT SYSTEM PROVIDING QUALITATIVE ACCOUNT/CUSTOMER ASSESSMENT VIA POINT IN TIME SIMULATION, U.S. Ser. No. 09/258,348, filed Feb. 26, 1999, now U.S. Pat. No. 6,405,173, and which is incorporated herein by reference.

BACKGROUND OF THE INVENTION

1. Field of the Invention

The present invention relates to a decision management system for creating strategies to manage clients, such as customers, accounts, or applicants, of an organization. More specifically, the present invention relates to a software tool for locating strategy components in a strategy of a decision management system.

2. Description of the Related Art

A typical organization maintains a significant amount of information about its clients, where "clients" refers to the customers, accounts or applicants for services or products of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manager could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefiting from decision support and therefore is yielding less than optimal results.

There are software based decision management systems in the marketplace which can organize information to make more effective decisions. Generally, a software based decision management system applies strategies to determine actions to be taken, monitors performance based on the taken actions, and refines the strategies in accordance with the monitored performance.

FIG. 1 is a diagram illustrating the general concept of a software based decision management system. Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

For example, the American Management Systems (AMS) Strata™ decision support system release 3.0 (hereinafter Strata™ release 3.0) is a software based decision management system which applies predictive modeling techniques to customer data, to thereby generate dramatic improvements in the effectiveness and profitability of customer interactions.

For example, FIG. 2 is a diagram illustrating the functional flow of a decision management system, such as that in Strata™ release 3.0. Referring now to FIG. 2, in step 140, an inbound event is a trigger that is received from one or more external systems to identify that a particular client event has occurred. Here, a client refers to people or entities which interact with, or do business with, an organization. For example, clients include customers, accounts or applicants for services or products of the organization. Each client has associated attributes such as, for example, client age, client balance, etc., which are maintained by the system. An attribute is a data element passed into the decision management system from an external source and/or derived by the decision management system through its own evaluation and processing.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is typically a grouping of clients as defined by the organization such that it aligns client interaction/value management objectives. In other words, categories represent groups of clients based on how the organization views the clients. For example, a bank may divide. clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155.and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

From step 165 the system moves to step 170, where inbound events are matched to function sets.

Function sets are decision logic modules formed by one or more "functions." Functions can be, for example, decision trees or score models. There are preferably several different functions which are available in the creation of any function set. One or more functions are typically grouped into function sets when they have comparable objectives (i.e., score cards to predict risk, decision trees to evaluate a credit line, etc.).

From step 170, the system moves to step 180, where the specific function sets for one or more specific inbound events are executed.

From step 180, the system moves to step 190, where the results, or action items, are output.

FIG. 3 is a diagram illustrating an example of a segment being divided into different test groups as in step 160 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to function sets in step 170 of FIG. 2. Referring now to FIG. 4(A), for example, when an inbound event 91 is a credit card campaign, the following function sets are applied, in order: credit card propensity to buy score 92, risk score 93 and offer selection 94. A result 95 of the applied function sets is a determination of whether to send a credit card offer.

Similarly, referring now to FIG. 4(B), for example, when an inbound event 96 is a late payment, the following function sets are applied, in order: risk score 97, underwriting treatment 98 and overdraft decision treatment 99. A result 100 of the applied function sets is a determination whether to send new underwriting and overdraft codes.

FIG. 5 is a diagram illustrating the grouping of functions to function sets. Referring now to FIG. 5, when an inbound event 91 triggers a specific function set, the specific function to be applied to a client will be determined by the test group into which the client was assigned. This allows for strategy experimentation by defining a common sequence of function sets for a given inbound event, but differentiating the actual function that will be invoked for each function set depending on the respective test group into which the client was randomly assigned.

If a function set only contains one function, no experimentation will take place in that function set since every client, regardless of its test group, will be required to use the function. For example, in FIG. 5, no experimentation takes place in the credit card propensity to buy score 92, since this function set contains only one function. By contrast, in FIG. 5, experimentation takes place in offer selection 94, since this function set includes more than one function. This approach provides the strategy analyst with the flexibility to selectively experiment on each strategy component of the overall strategy, as appropriate.

Function sets can include many different types of functions, including, for example, decision trees, score models and matrices. Decision trees are the most common.

Therefore, a function set is, generally, a reusable business process triggered by one or more events. A function set may contain one or more functions for accomplishing its objectives.

FIG. 6 is a diagram illustrating the creation of a matrix of the categories and test groups for a respective segment, as in step 165 of FIG. 2. Referring now to FIG. 6, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

FIG. 7 is a diagram illustrating an example of the correspondence of functions of a respective function set to the strategy test cells of the matrix. Referring now to FIG. 7, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

As a strategy is designed, the strategy test cells can be examined against each other. Preferably, there is a common set of metrics for the entire matrix, where the metrics are the appropriate measurements against which to measure the performance of the strategy defined for a segment. Then, it can be determined, for example, how well a test group is shifting customers to other categories. For example, it can be determined how quickly test group 1 is moving Bronze customers into the Platinum category in the matrix of FIG. 6. The opposite undesirable effect can also be assessed. Many other types of determinations can be made, based on the various implemented strategies.

The above figures represent the logical flow of how strategy test cells are created, or assigned. However, the systematic or technical flow may be different. Moreover, the logical flow in the above figures represents only one specific example of a decision management system, and decision management systems are not limited to this example. Instead, different decision management systems can have, and likely will have, different logical flows. For example, a decision management system might not assign clients to segments (as in step 150 of FIG. 2), assign clients to categories (as in step 155 of FIG. 2), or create a matrix for each segment (as in step 165 of FIG. 2).

In addition to applying strategies, a decision management system measures performance so that the overall strategy can be appropriately adjusted to optimize results.

For example, FIG. 8 is a diagram illustrating the overall operation of the above-described decision management system for measuring performance. More specifically, FIG. 8 illustrates an example of a data aggregation operation for effectively managing and organizing data.

Referring now to FIG. 8, in step 200, for the above-described decision management system, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

Therefore, a report group is a tag which identifies a unique path through a strategy, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. In the present example of a decision management system, categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy.

In the present example, all clients in a given report group should be relatively homogenous, the difference being the test group to which the clients were randomly assigned and thus the action/decision applied to the clients being based on their test group. Since report groups are typically independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

Referring again to FIG. 8, from step 200 the system moves to step 210, where observation points are determined. More specifically, in this example, each time a decision is made about a client, that decision is posted. More importantly, in this example, the report group that the client passed through is posted. In addition, in this example, what segment, category, test group, etc. is posted.

From step 210, the system moves to step 220, where performance over time for observation points is accumulated, and matched against the observation points. Generally, an observation point is a snap-shot of a point in time, and has dimensions across which analysis of the data can be performed. A specific client can have multiple observation points. Therefore, in step 210 in FIG. 8, observation points for a client are noted. Then, in step 220, for each client, performance data is matched against observation points. For example, once a month, performance data for a client may be obtained. This performance data is then matched, or correlated, to the appropriate observation points for each account and/or customer.

From step 220, the system moves to step 230, where the collected performance data is periodically aggregated and grouped, preferably, into all possible permutations of the dimensions noted when the observation point was taken and selected for analysis.

Therefore, the data aggregation operation of FIG. 8 prepares and correlates data. In this example, the data aggregation operation can translate the correlated data into a multi-dimensional data model, to support the use of online analytical processing (OLAP) technology. Then, OLAP technology can be applied to evaluate the aggregated data. Generally, OLAP is a known technology that allows for the multi-dimensional analysis of data such that results can be reported in a manner consistent with explaining their significance or inter-relationships. OLAP is based upon the use of multi-dimensional data structures and aggregated data to ensure acceptable performance in leveraging technology.

OLAP uses the concepts of "continuous" and "discrete" dimensions. Generally, with a discrete dimension, every value of that dimension has its own discrete value. For example, report groups A, B and C are discrete values of the report group dimension. By contrast, with a continuous dimension, there are a near infinite number of values of the element constituting the dimension. For example, there may be an infinite number of values of a balance dimension, since a balance may be virtually any amount. Usually, ranges are used with continuous dimensions so that the dimensions appear more discrete, thereby allowing the data to be managed effectively. The use of OLAP in a decision management system is described in U.S. application titled USE OF ONLINE ANALYTICAL PROCESSING (CLAP) IN A RULES BASED DECISION MANAGEMENT SYSTEM, U.S. Ser. No. 09/217,016, filed Dec. 21, 1998, and which is incorporated herein by reference.

FIG. 9 is a diagram illustrating an example of a definition hierarchy of a decision management system, and provides a version level for creating different strategy versions. Referring now to FIG. 9, a version level can be interjected between a system level and a segment level. A function level is shown as being under the version level and at the same level as segment. Thus, in FIG. 9, different functions are associated with different versions and functions are associated with specific segments. Levels and associations provide the user with the ability to organize the strategy components of a strategy.

While FIG. 9 illustrates a versioning level interjected between the system level and the segment level, a versioning level can be virtually at any level in the definition hierarchy. For example, FIG. 10(A) is a diagram illustrating a definition hierarchy having the version level beneath the system level and the function level. In addition, version levels can exist simultaneously at multiple levels in the definition hierarchy. For example, FIG. 10(B) is a diagram illustrating a definition hierarchy having a version level above and beneath the function level. The use of versioning levels in a decision management system is described, for example, in U.S. application titled VERSIONING IN A RULES BASED DECISION MANAGEMENT SYSTEM, U.S. Ser. No. 09/219,341, filed Dec. 23, 1998, and which is incorporated herein by reference.

As can be seen from above, software based decision management systems apply strategies to determine actions to be taken, monitor performance based on the taken actions, and refine the strategies in accordance with the monitored performance.

Moreover, as can be seen from above, a strategy is formed of many different strategy components. Here, a strategy component refers to any part of a strategy implemented in a decision management system. For example, a strategy component can be a system, version, attribute, inbound event, outbound event, function, function set, segment, report instruction, continuous dimension, test group or report group.

Unfortunately, a conventional decision management system cannot effectively search for a respective strategy component of a strategy to determine each place where the strategy component is being used in the strategy, or to determine the inter-relationships of the strategy component to other strategy components. More specifically, in a conventional decision management system, to search for a component in the strategy, a system analyst would have to dump data out of various databases, and manually examine the contents of the data to look for links and relationships. Alternatively, the system analyst could manually go through each decision, decision tree, score model, etc, and manually identify links between these components.

As an example, a company might use a strategy which includes 1000 decision trees. A specific decision might be used, for example, in 465 of these decision trees. A system analyst would have to manually examine each decision tree and look for the decision. In this case, it would be very easy for the strategy analyst to unintentionally overlook a specific decision, decision tree, or link.

Moreover, changes to the strategy would require an additional, complex operation to be manually performed by the strategy analyst to manually examine and link components in the changed strategy.

As an example, it may take a strategy analyst days or weeks to manually examine and link components in a complex strategy. This is an extremely long amount of time, which can be very expensive and incur unacceptable delays.

SUMMARY OF THE INVENTION

Therefore, it is an object of the present invention to provide a decision management system which can effectively and inherently search for a respective strategy component of a strategy to determine each place where the strategy component is being used in the strategy, and to determine the inter-relationships of the strategy component to other strategy components.

Objects of the present invention are achieved by providing a computer-implemented, software based, decision management process and apparatus which automatically searches for a respective strategy component through a decision management strategy to identify where the strategy component is being used in the strategy, and to determine the strategy component's inter-relationships in the strategy.

Moreover, objects of the present invention are achieved by providing a computer-implemented decision management process including (a) providing a decision management strategy formed of a plurality of strategy components; (b) selecting a strategy component of the plurality of strategy components; (c) automatically presenting a plurality of selectable inquiries to an end user of the process, the plurality of selectable inquiries relating to the location of the selected strategy component in the strategy and/or inter-relationships between that type of strategy component and other strategy components in the strategy; (d) selecting a respective inquiry of the plurality of selectable inquiries by the end user; and (e) automatically identifying relationships for the selected strategy component through the strategy in accordance with the selected inquiry to identify where the strategy component is being used/referenced in the strategy. The strategy can be searched, for example, by software which analyzes linked tables of a relational data model implementing the strategy.

Objects of the present invention are also achieved by providing a computer-implemented decision management process including (a) providing a decision management strategy formed of a plurality of strategy components; (b) selecting a first strategy component; (c) automatically presenting a first group of selectable inquiries to an end user of the process, the inquiries of the first group being context sensitive to thereby correspond to the first strategy component; (d) selecting a respective inquiry of the first group of selectable inquiries by the end user; (e) automatically searching for the first strategy component through the strategy in accordance with the selected inquiry of the first group of selectable inquiries, to determine a second strategy component satisfying the selected inquiry; (f) automatically presenting a second group of selectable inquiries to the end user of the process, the inquiries of the second group being context sensitive to thereby correspond to the second strategy component; (g) selecting a respective inquiry of the second group of selectable inquiries by the end user; and (h) automatically searching for the second strategy component through the strategy in accordance with the selected inquiry of the second group of selectable inquiries.

In addition, objects of the present invention are achieved by providing a computer-implemented decision management system including a strategy creator and a strategy searcher. The strategy creator creates a decision management strategy formed of a plurality of strategy components. The strategy searcher is software based and automatically searches for a respective strategy component through the strategy to identify where the strategy component is being used in the strategy.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 (prior art) is a diagram illustrating a matrix created in a decision management system, for analyzing data and applying strategies.

FIG. 12(B) is a diagram illustrating an example of columns of a global reference table in a decision management system, according to an embodiment of the present invention.

FIGS. 14(A) through 14(D) are diagrams illustrating the linking of relational tables for displaying the windows in FIGS. 13(A) through 13(F), according to an embodiment of the present invention.

DESCRIPTION OF THE PREFERRED EMBODIMENTS

Figure 1:
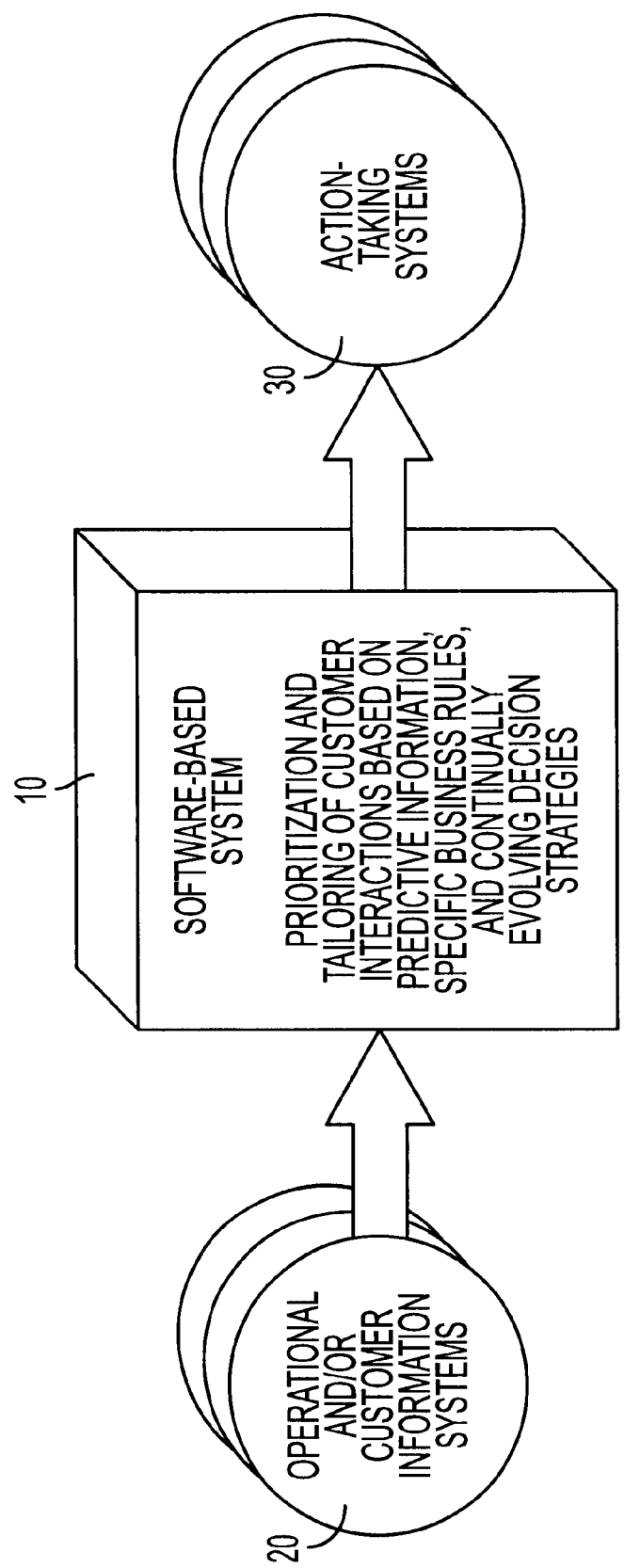
FIG. 1 (prior art) is a diagram illustrating the general concept of a software based decision management system.
Figure 2:
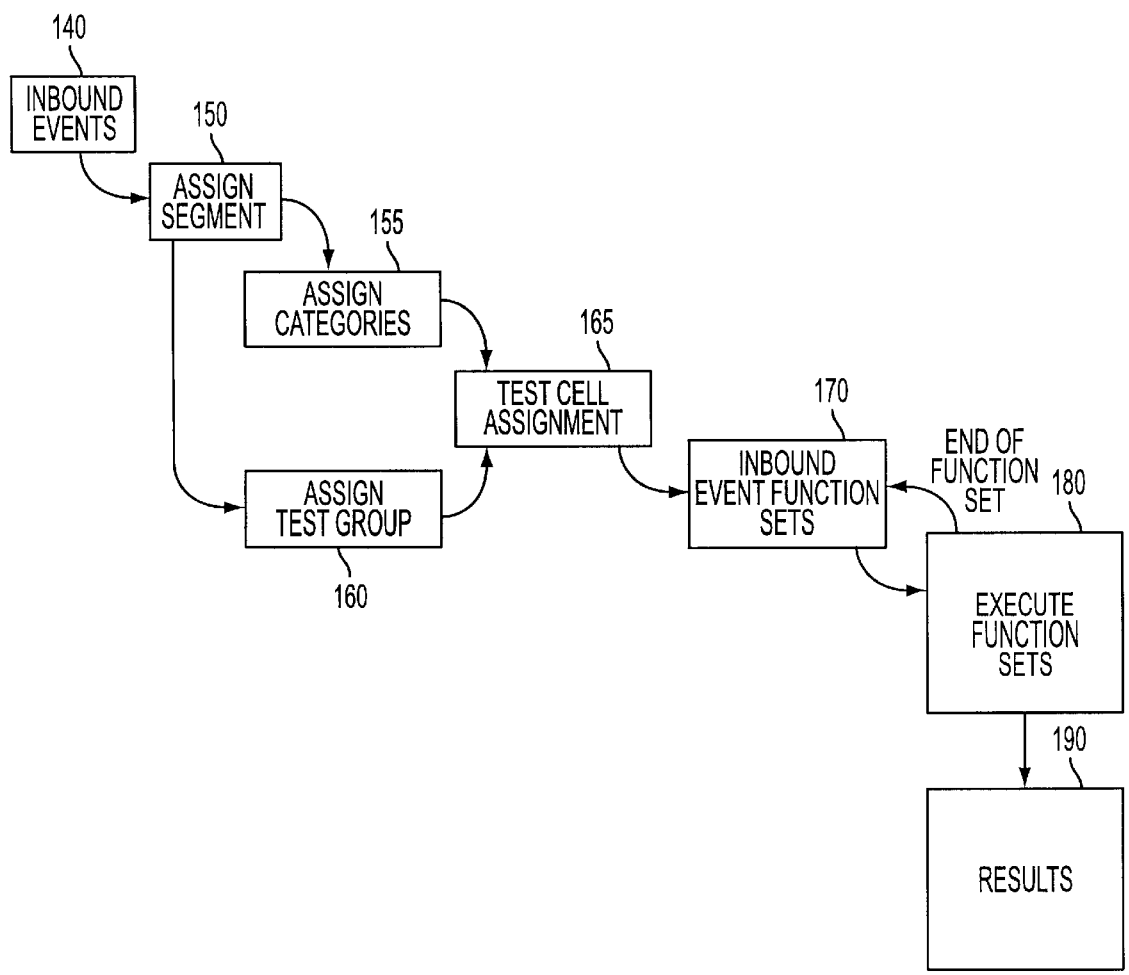
FIG. 2 (prior art) is a diagram illustrating the functional flow of a decision management system.
Figure 3:
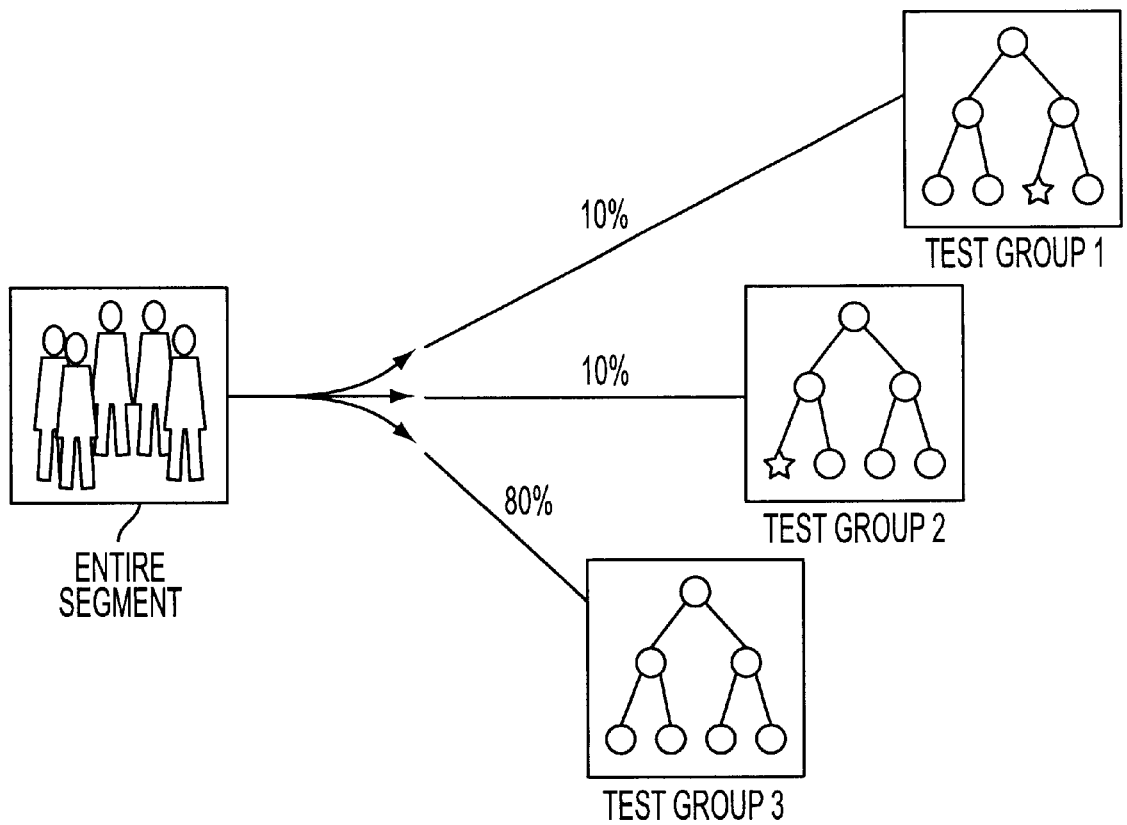
FIG. 3 (prior art) is a diagram illustrating an example of a segment being divided into different test groups in a decision management system.
Figures 4A, 4B:
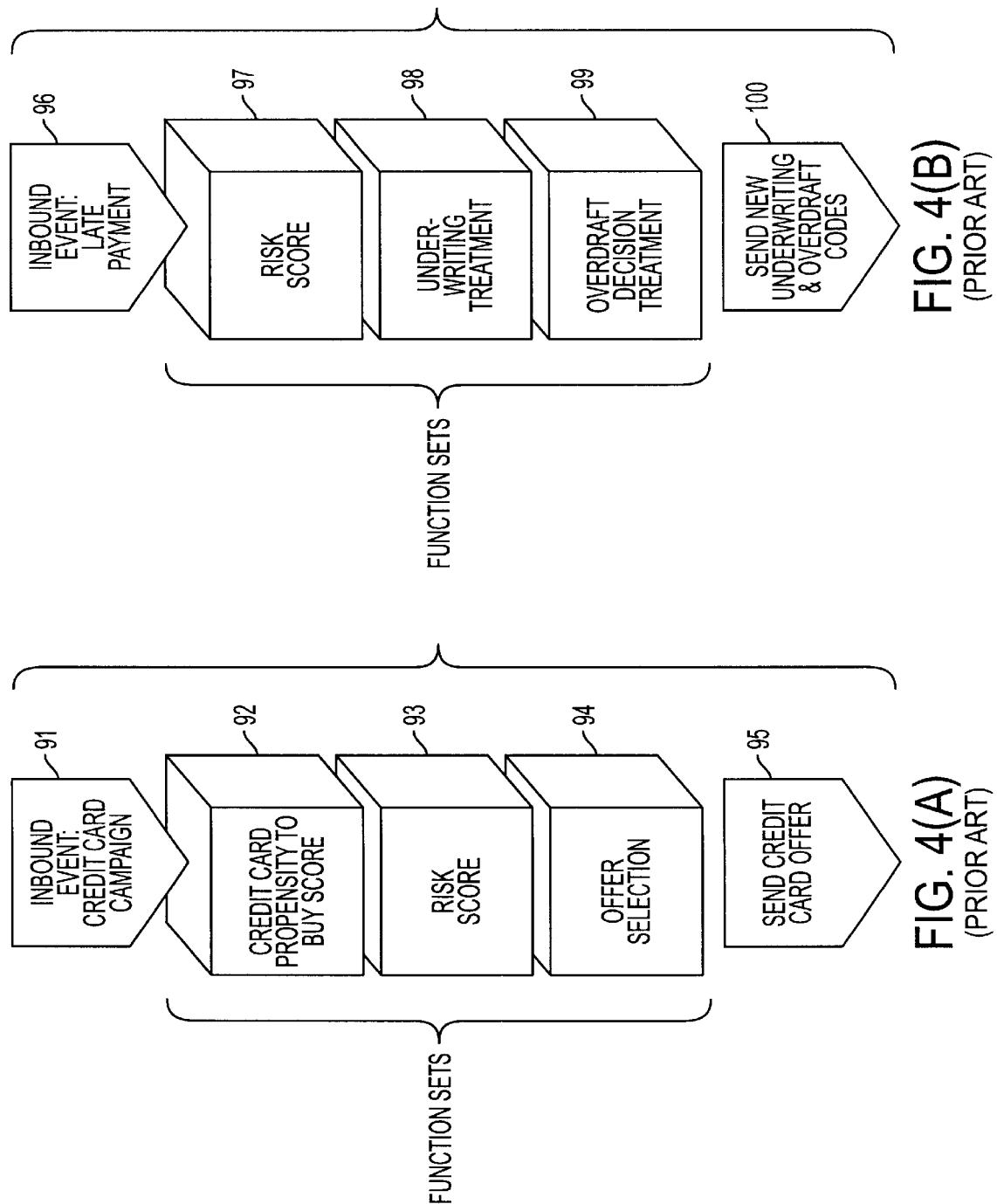
FIGS. 4(A) and 4(B) (prior art) are diagrams illustrating the matching of inbound events to function sets-in a decision management system.
Figure 5:
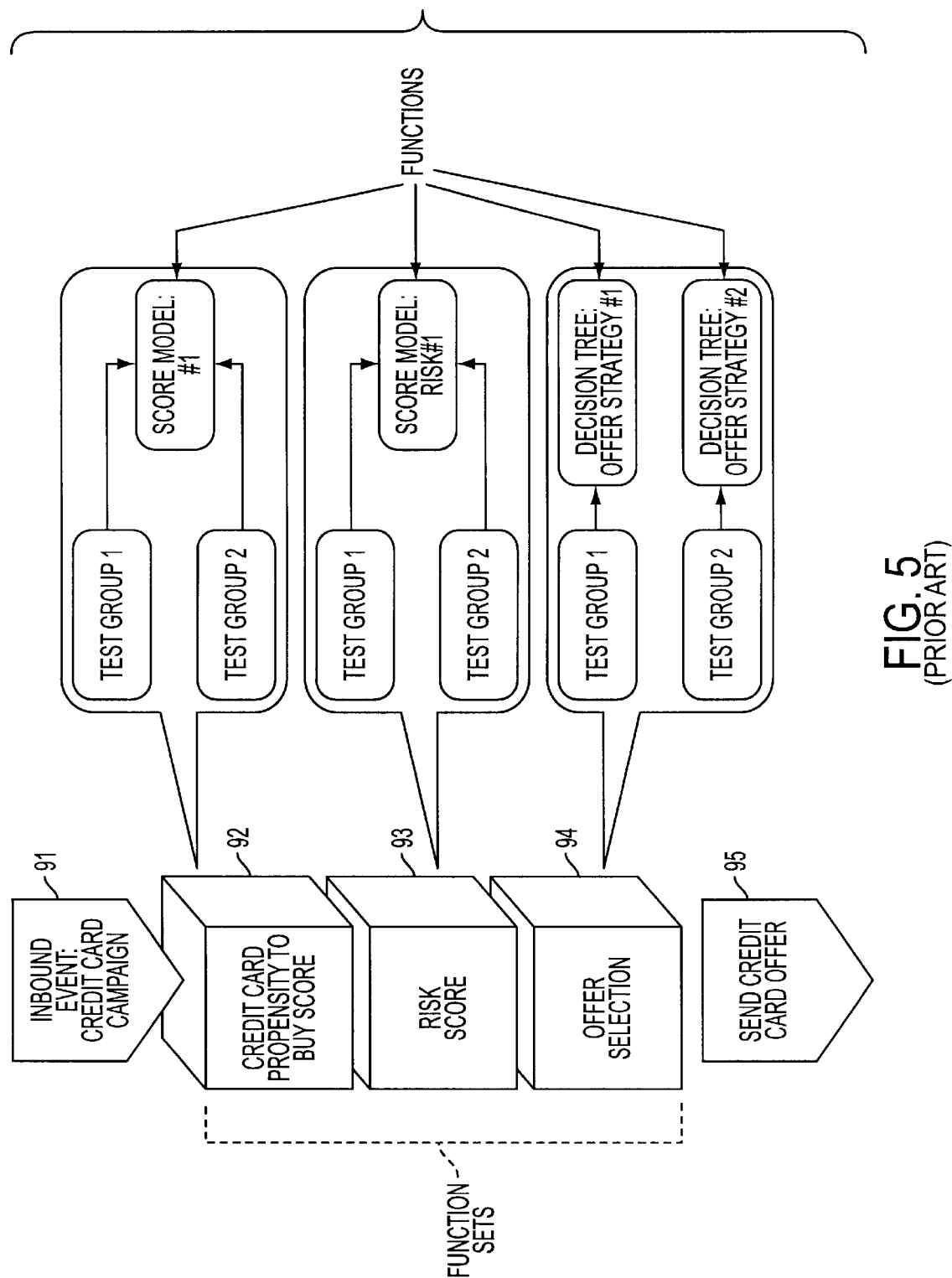
FIG. 5 (prior art) is a diagram illustrating the grouping of functions to function sets in a decision management system.
Figure 7:
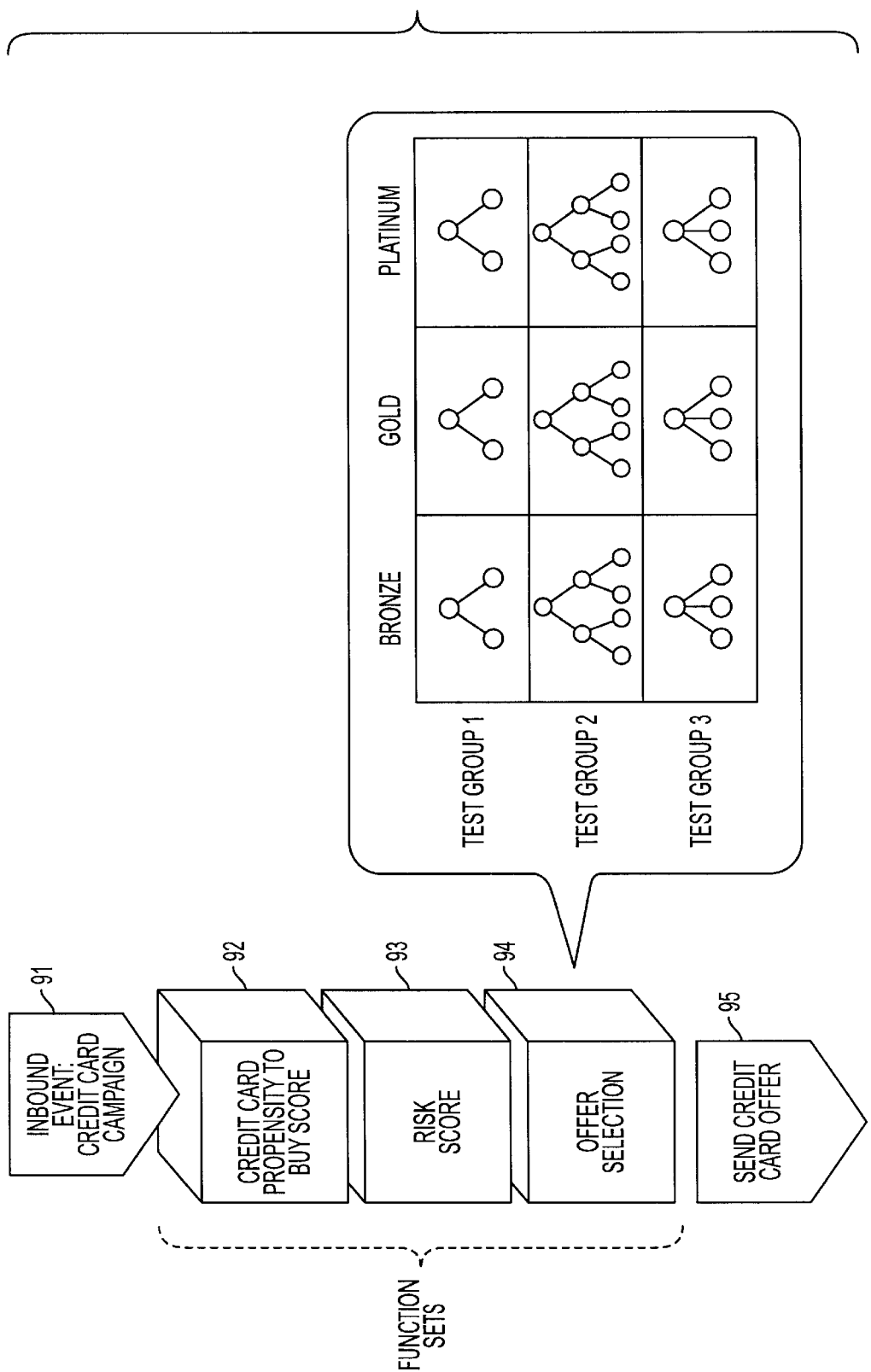
FIG. 7 (prior art) is a diagram illustrating the correspondence of functions of a respective function set to strategy test cells of a matrix, in a decision management system.
Figure 8:
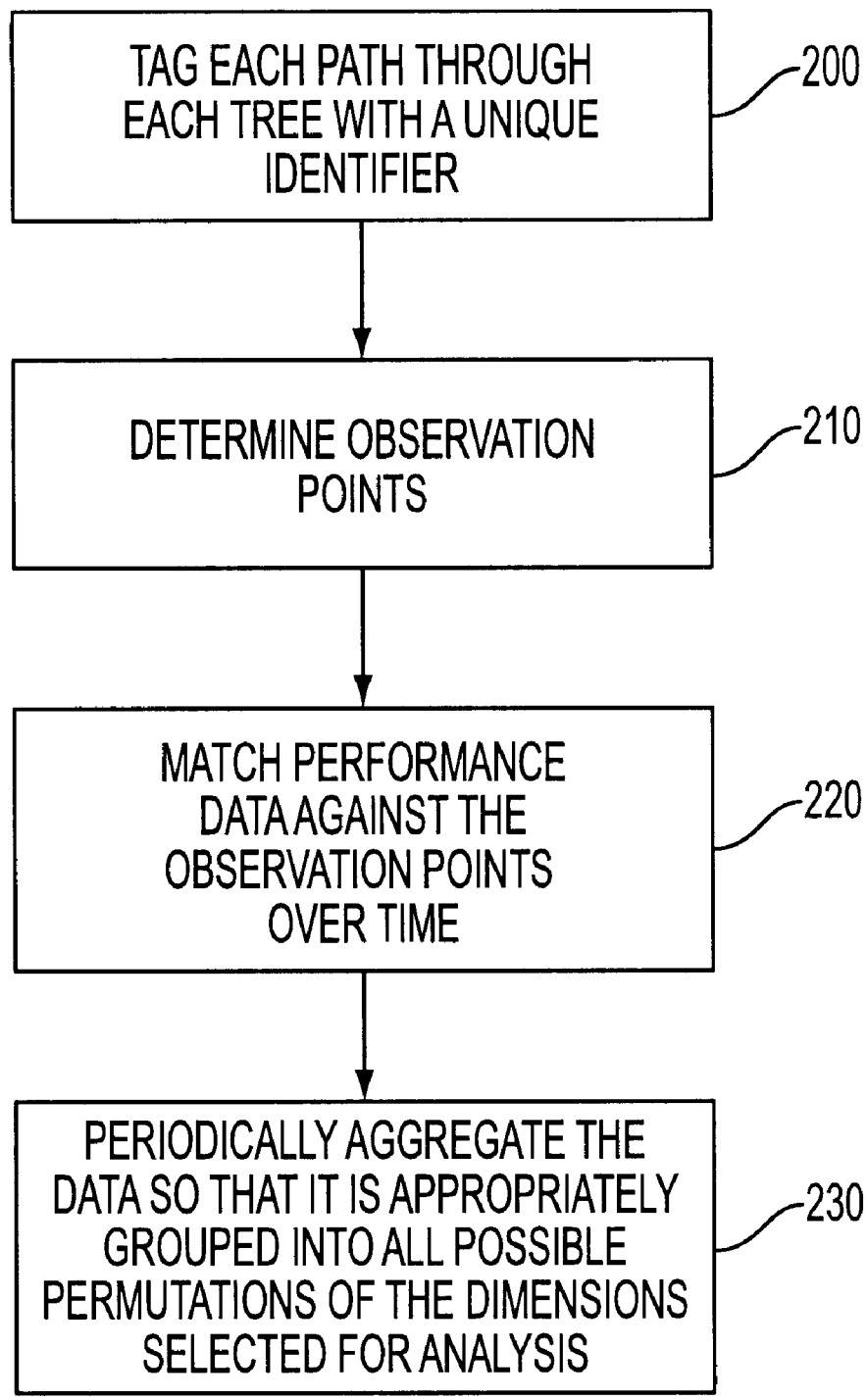
FIG. 8 (prior art) is a diagram illustrating an example of the overall operation of a decision management system for measuring performance.
Figure 9:
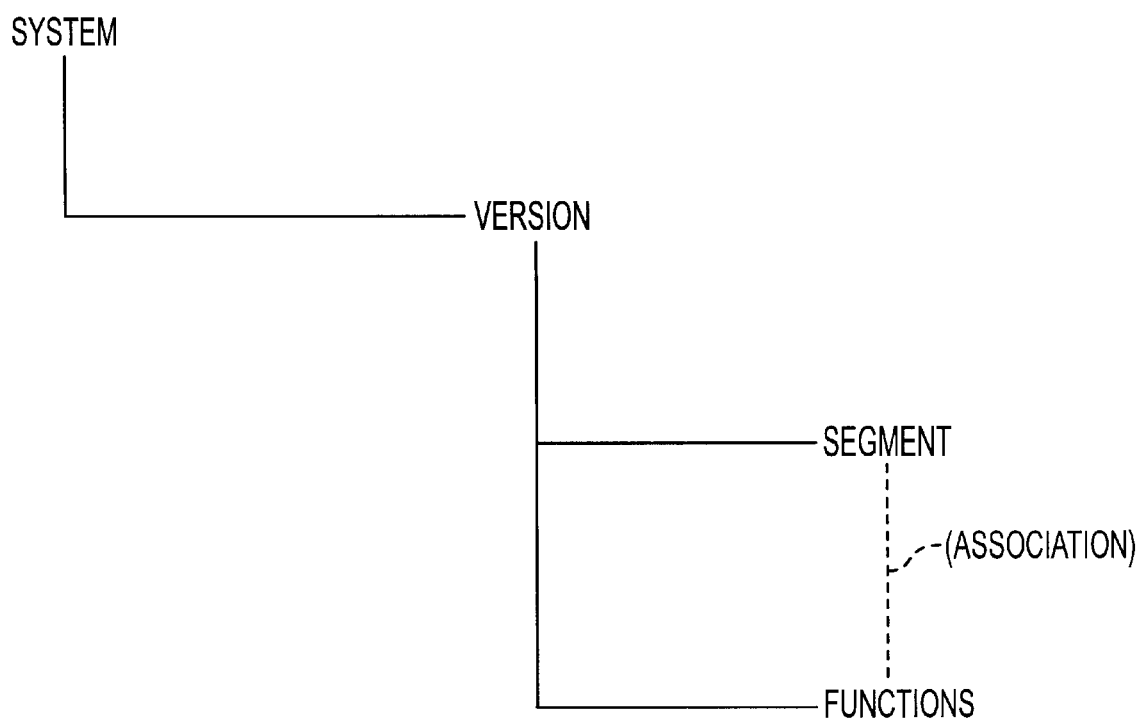
FIG. 9 (prior art) is a diagram illustrating an example of a definition hierarchy of a decision management system.
Figure 10A:
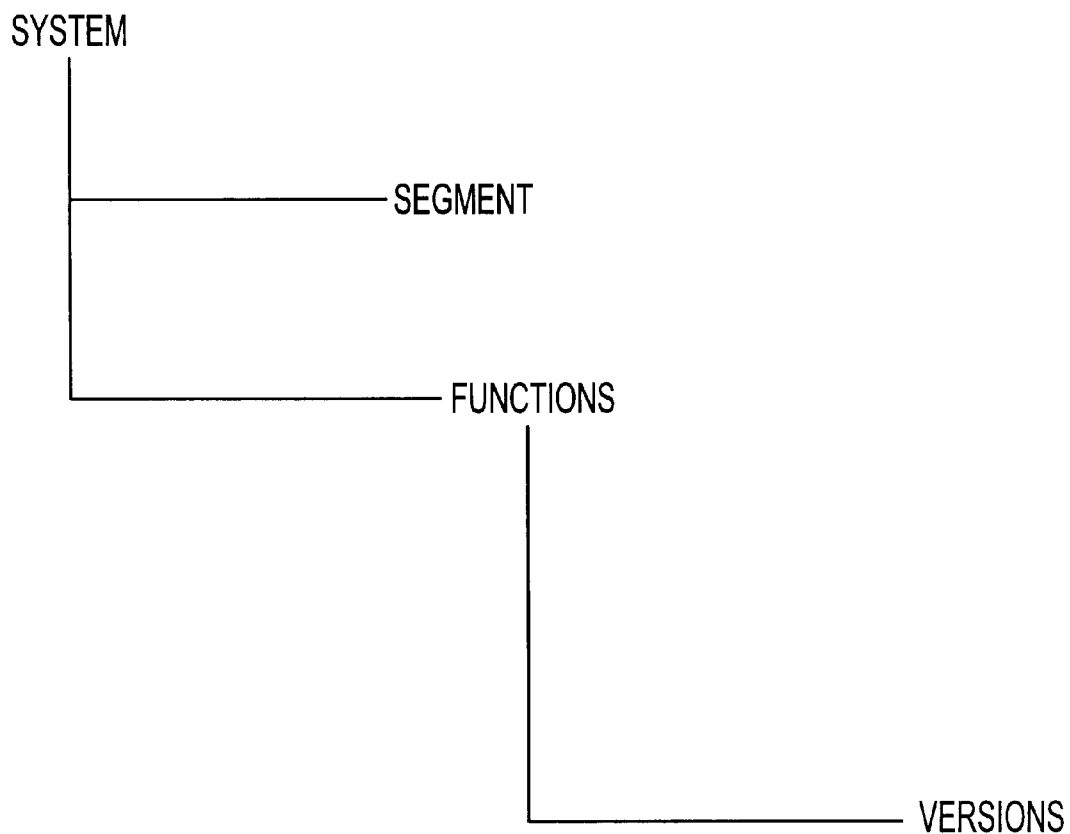
FIGS. 10(A) and 10(B) (prior art) are diagrams illustrating examples of definition hierarchies of a decision management system.
Figure 10B:
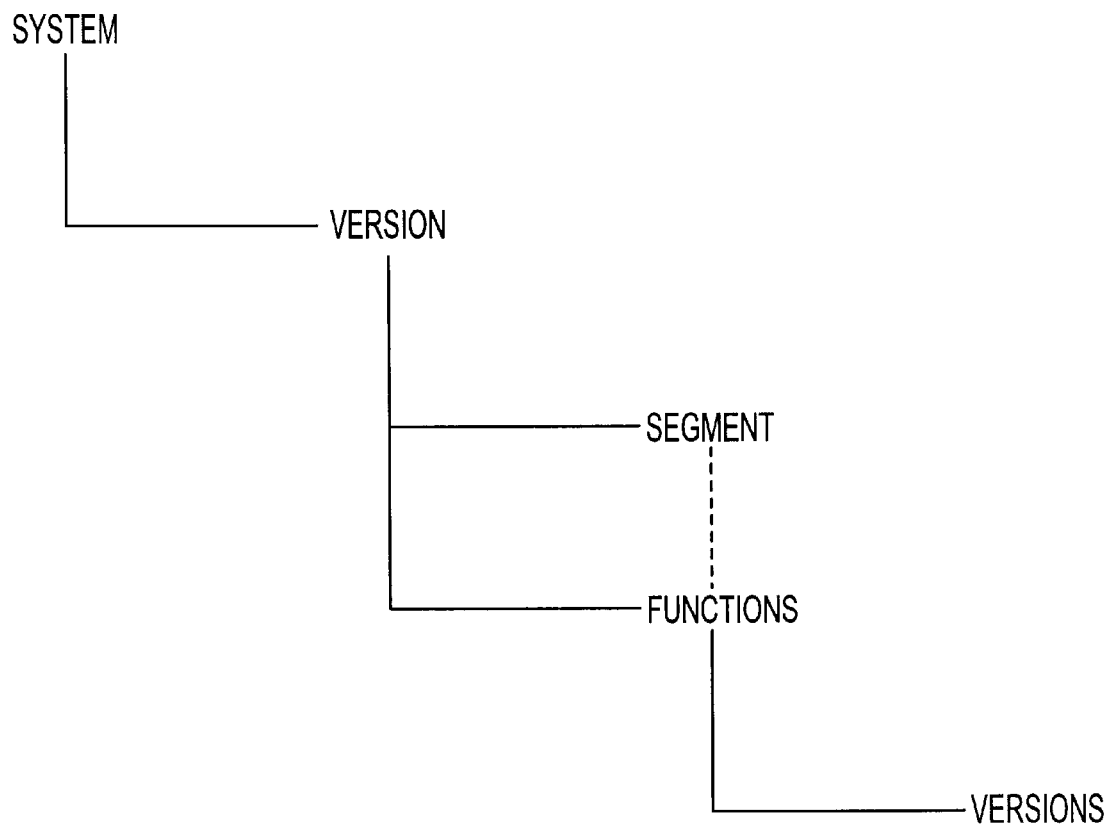

Reference will now be made in detail to the present preferred embodiments of the present invention, examples of which are illustrated in the accompanying drawings, wherein like reference numerals refer to like elements throughout.

According to embodiments of the present invention, a decision management system automatically searches, via software, for strategy components and their relationships in a strategy. For example, the present invention will allow a system user to identify where a strategy component of a strategy is used quickly. This will give the user the ability to assess quickly the implications of modifying a strategy component through an automated search facility.

More specifically, according to embodiments of the present invention, a window is provided on a system user's desktop which can be accessed, for example, from a menu on the desktop. The window allows the user to select a strategy component type from, for example, a drop down list. The user indicates a search for all strategy components of a particular type (e.g., attributes). When the search is initiated, the strategy component(s) that were found are displayed in a result window. From here, the user may access a menu of subsequent searches for that strategy component type. For example, if a decision is found, the user may then search for functions called by the decision, or decision trees invoking that particular decision. Results of this second search are preferably displayed in the next result window. A plurality of result windows can be provided, each with the ability to initiate a subsequent search.

In some instances, strategy components have only one valid inquiry that can be performed by the system. For such cases, the user may not be required to initiate the inquiry. Rather, simply selecting the strategy component will initiate all of the subsequent inquiries.

Figure 11A:
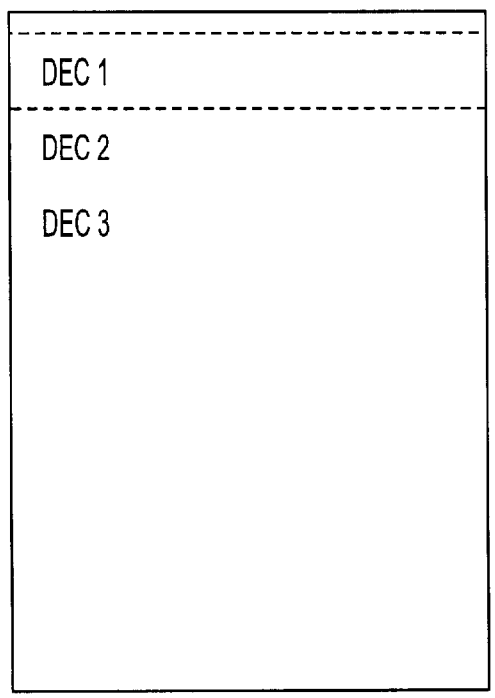
FIGS. 11(A) through 11(F) are diagrams illustrating windows appearing on a user's desktop for an example of a strategy component search in a decision management system, according to an embodiment of the present invention.

FIGS. 11(A) through 11(F) are diagrams illustrating windows appearing on a user's desktop for an example strategy component search, according to an embodiment of the present invention. Referring now to FIG. 11(A), assume that the user has indicated that a "decision" is the type of strategy component which is to be searched. The system will then provide a list of decisions to be selected.

For example, FIG. 11(A) is a diagram illustrating a window displayed on the user's desktop, indicating that three different decisions,. referred to as DEC 1, DEC 2 and DEC 3, were found in the strategy. The user then selects DEC 1, as indicated by the dashed lines in FIG. 11(A) to indicate, for example, that the user highlighted DEC 1 in the window.

Figure 11B:
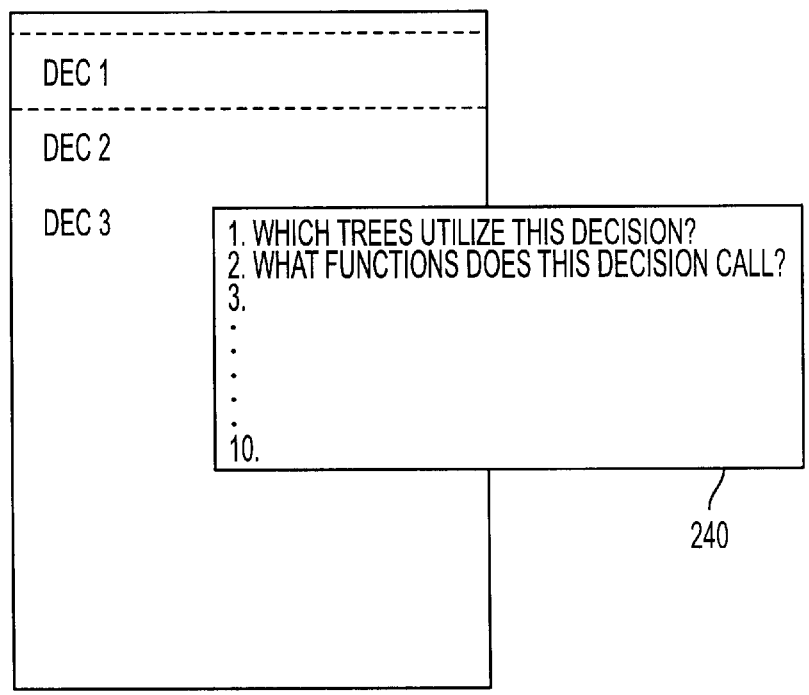

Then, as illustrated in FIG. 11(B), a pop-up menu 240 appears, to provide the user with a list of inquiries which can be selected to perform a further search. These possible inquiries are different for different types of strategy components, but are the same for strategy components of the same type. For example, all decisions would get the same possible inquiries. Similarly, all decision trees would get the same possible inquiries. However, the inquiries for decisions would be different than that for decision trees. Therefore, the inquiries can be considered as being context sensitive, since the specific inquiries to be presented to the end user are based on the type of strategy component. Other factors may also be used in establishing context sensitivity. Inquiries may be limited to those that are valid for the specific component, such as DEC 1.

For example, in FIG. 11(B), ten different inquiries might be listed. These inquiries are specific to decisions, and are listed because a search will be performed for the selected decision DEC 1. Since these inquiries relate to decisions, the inquiries might include, for example, "Which trees utilize this decision?", "What functions does this decision call?", and "What strategy components would be executed for this decision?" To simplify the illustration, FIG. 11(B) only shows two of these inquiries, although many different inquiries can be actually displayed.

If, instead of decisions, the inquiries related to score models, the inquiries might include, for example, "What attributes are used in this score model?", "Which decisions call this score model?", and "Which outbound event list does this score model invoke?" The precise inquiries to present can be determined by a strategy analyst based on what the end users of the system want to ask about the various strategy components. Once these inquiries are determined, they can easily be implemented into the system via, for example, a relational data model as described in detail further below. Thus, the present invention is not limited to any specific inquiries for any specific strategy components.

Referring now to FIG. 11(B), assume that the user selects the first inquiry: "Which trees utilize this decision?" A search is then performed to answer this inquiry.

Figure 11C:
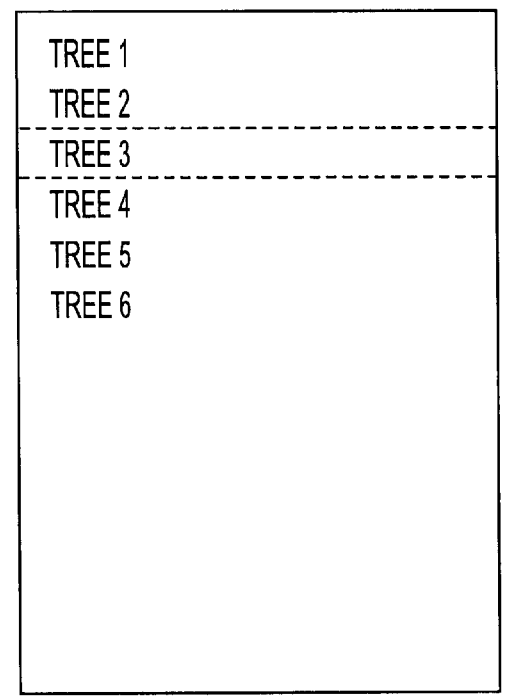

For example, as illustrated in FIG. 11(C), a window displays the results of the inquiry. More specifically, as illustrated in FIG. 11(C), decision trees 1 through 6 were found which utilize DEC 1. This window may be displayed simultaneously with windows presenting prior searches, selections and actions.

Assume that the user selects decision tree 3, as indicated by the dashed lines in FIG. 11(C) to indicate, for example, that the user highlighted decision tree 3 in the window.

Figure 11D:
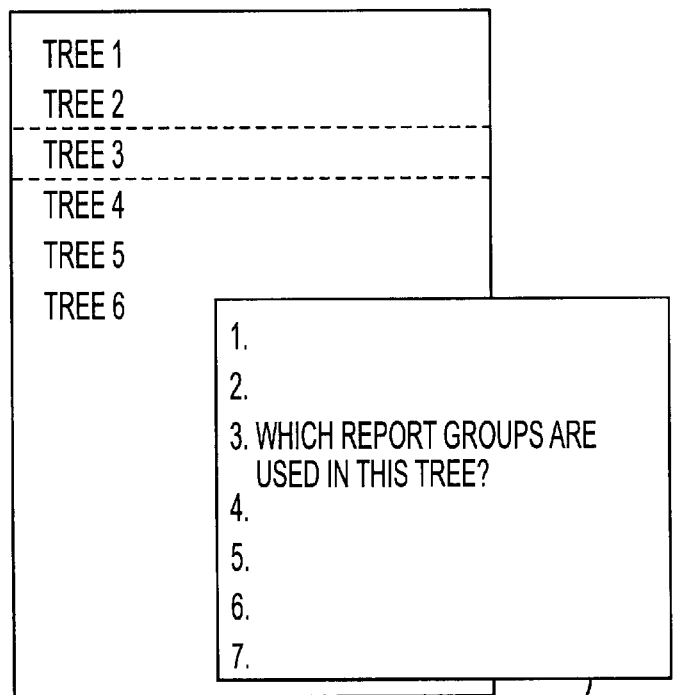

Then, as illustrated in FIG. 11(D), a pop-up menu 242 appears, to provide the user with a list of inquiries which can be selected to perform a still further search. For example, in FIG. 11(D), seven different inquiries might be listed as appropriate for the component type and specific component. (However, to simplify the illustration, only the third inquiry is shown in the figure.) These inquiries are specific to decision trees, and are listed because a search was performed for a decision tree. The window containing these inquiries could appear automatically (upon selection of a component) or could be optionally made to appear through an additional action taken by the user.

Assume that the user selects the third inquiry: "Which report groups are used in this tree?" Then, a search is performed to answer this inquiry.

Figure 11E:
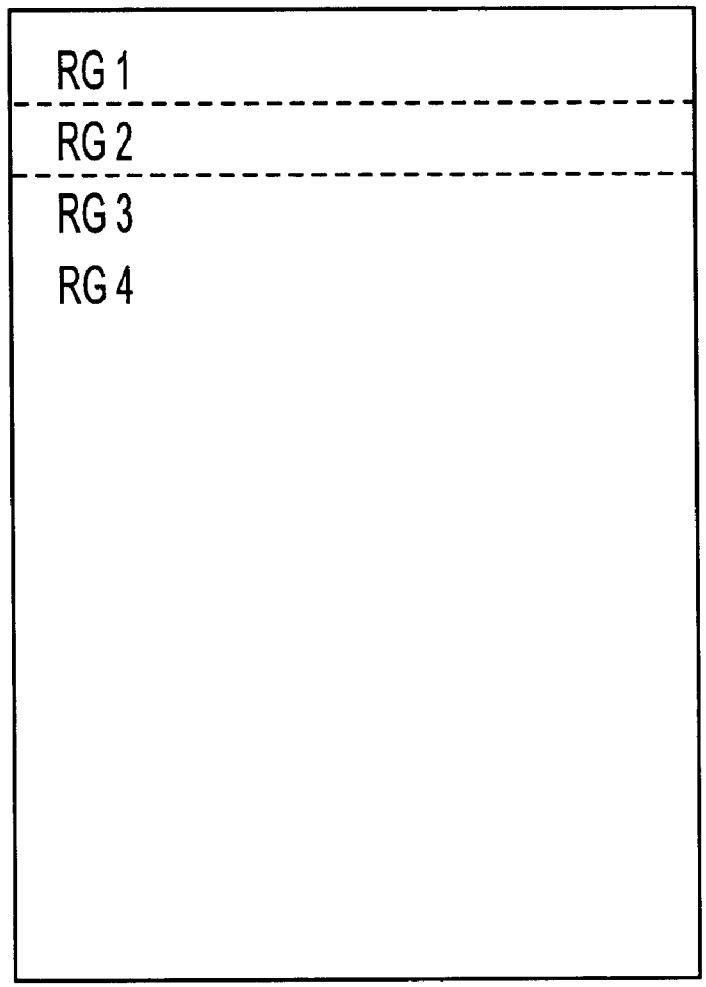

For example, as illustrated in FIG. 11(E), a window displays the results of the inquiry. More specifically, as illustrated in FIG. 11(E), report groups RG 1 through RG 4 were found which are used in decision tree 3. The user can then select a specific report group, such as RG 2, as indicated by the dashed lines in FIG. 11(E) to indicate, for example, that this report group was highlighted by the user. This selected report group can then be the first search for a new screen (assuming the existing screen has been filed with windows from completed searches), thereby re-initiating the path through the search/result windows.

Figure 11F:
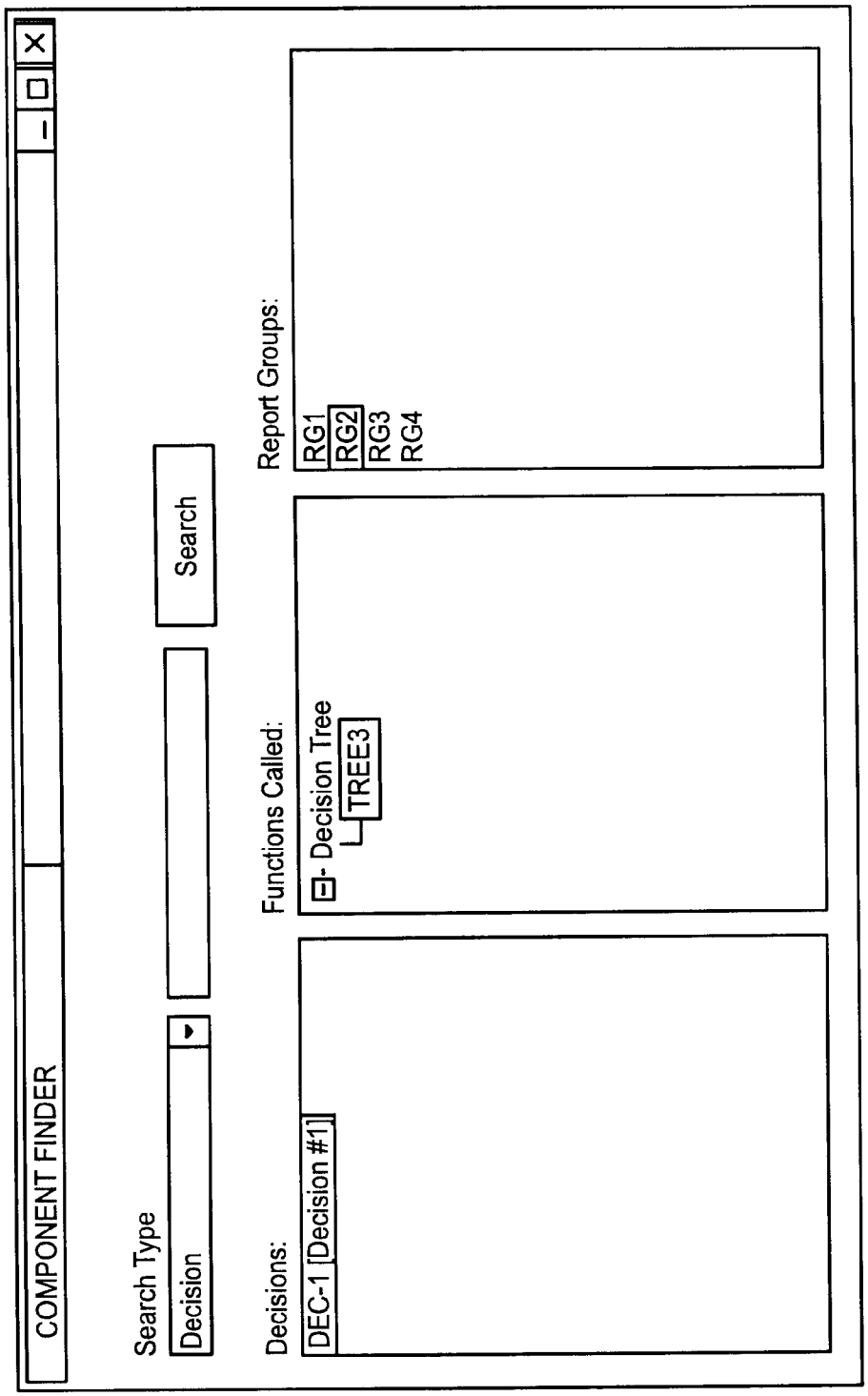

FIG. 11(F) shows an overall display which might be seen by the user in the above-described example, according to an embodiment of the present invention. However, the various pop-up windows are not shown in FIG. 11(F).

As mentioned above, only a certain number of windows will effectively fit on the user's screen display. Therefore, from the last window, the user may use a result item as the first search item again, re-initiating the path through the search/result windows. For example, in FIG. 11(F), the report group RG2 can be selected for a further search. This selected item would then be moved to the first window on the left side of the figure, so that a new search can be performed.

Moreover, a report can be printed to show the entire sequence, including the selected inquiries and results. For example, for all the windows in the display, the selected entries for each inquiry that lead to that result set are retained. This information is then printed. There are many different techniques for retaining information, and printing the retained information. Such techniques are known by persons of skill in the art.

An important aspect of the present invention is that the various inquiries displayed in the pop-up menus can be predetermined and set in the system. Therefore, at the appropriate time, these inquiries simply "pop-up" for selection by the user. Thus, the user does not have to formulate the inquiries manually or understand relationships between components, but simply select one of the predetermined inquiries.

Searching for strategy components via the use of windows and predefined inquiries, as described above, can be accomplished, for example, via a data model using relational tables linked together in an appropriate manner.

Figure 12A:
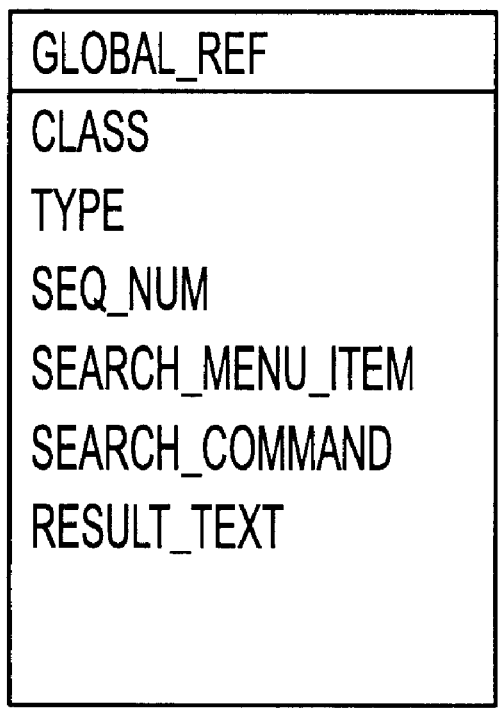
FIG. 12(A) is a diagram illustrating a global reference table in a decision management system, according to an embodiment of the present invention.

For example, FIG. 12(A) is a diagram illustrating a table from a data model using relational tables, to search for strategy components in a strategy, according to an embodiment of the present invention. Referring now to FIG. 12(A), a global reference table (GLOBAL_REF) includes rows of CLASS, TYPE, SEQ_NUM, SEARCH_MENU_ITEM, SEARCH_COMMAND and RESULT_TEXT.

For example, in the global reference table, CLASS indicates the class of the strategy component. The class can be considered a high-level category of the strategy component. Different classes would be, for example, system, version, attribute, inbound event, outbound event, function, function set, a segment, a report instruction, continuous dimension, test group or report group. For example, the global reference table might indicate CLASS="F" if the strategy component is a function, or CLASS="A" if the strategy component is an attribute. However, the present invention is not limited to defining any particular classes, or any particular terminology for naming classes.

TYPE indicates the type of the strategy component in the class, and is a subclass of CLASS. For example, for CLASS="F", TYPE="D" would indicate a decision, TYPE="T" would indicate a decision tree, TYPE="M" would indicate a score model, and TYPE="X" would indicate a matrix. Here, decisions, decision trees, score models and matrices are all strategy components of the same class (that is, CLASS="F"). That is, they are all functions. However, the present invention is not limited to defining any particular types of classes or to any particular terminology for naming types.

SEQ_NUM indicates the number of the inquiry for a specific type of strategy component. For example, in FIG. 11(B), each of the inquiries in pop-up menu 240 has its own sequence number, from 1 to 10 in the example. Inquires that are used most frequently preferably have lower sequence numbers so that they are at the top of the list of inquiries.

SEARCH_MENU_ITEM is the actual text that will be presented to the user in a pop-up box. Therefore, for example, for SEQ_NUM 1 in FIG. 11(B), the SEARCH_MENU_ITEM would be "Which trees utilize this decision?"

SEARCH_COMMAND indicates the technical code that will retrieve the appropriate data to answer the inquiry. This code will most likely be different, depending on the underlying technology used, such as C++ or Powerbuilder™. Of course, the present invention is not limited to being implemented with any particular type of technology. Determining the specific code in accordance with the implementing technology would be well within the knowledge of a person of skill in the art.

RESULT_TEXT is the description of the result set from the inquiry that is initiated from the pop-up menus. The RESULT_TEXT is preferably displayed above the results of the inquiry.

FIG. 12(A) illustrates only one example of a global reference table. The present invention is not limited to the particular rows or information contained in this specific example of a global reference table.

FIG. 12(B) is a diagram illustrating an example of several columns of the global reference table in FIG. 12(A), relating to the inquiries listed in FIG. 11(B).

As can be seen from FIGS. 12(A) and 12(B), the global reference table is a data structure which provides rules for (a) executing inquiries on the relationship and interdependencies amongst the various strategy components located in the decision strategies, and (b) displaying the results of those inquiries in the appropriate format (e.g., a tree view or a list view). The global reference table's rules are preferably differentiated by component class and component type, to ensure that the appropriate inquiries and display context are maintained.

FIGS. 13(A) through 13(F) are diagrams illustrating windows appearing on a user's desktop for an additional example strategy component search, and FIGS. 14(A) through 14(D) are diagrams illustrating the linking of relational tables for displaying the windows in FIGS. 13(A) through 13(F), according to an embodiment of the present invention.

Figure 13A:
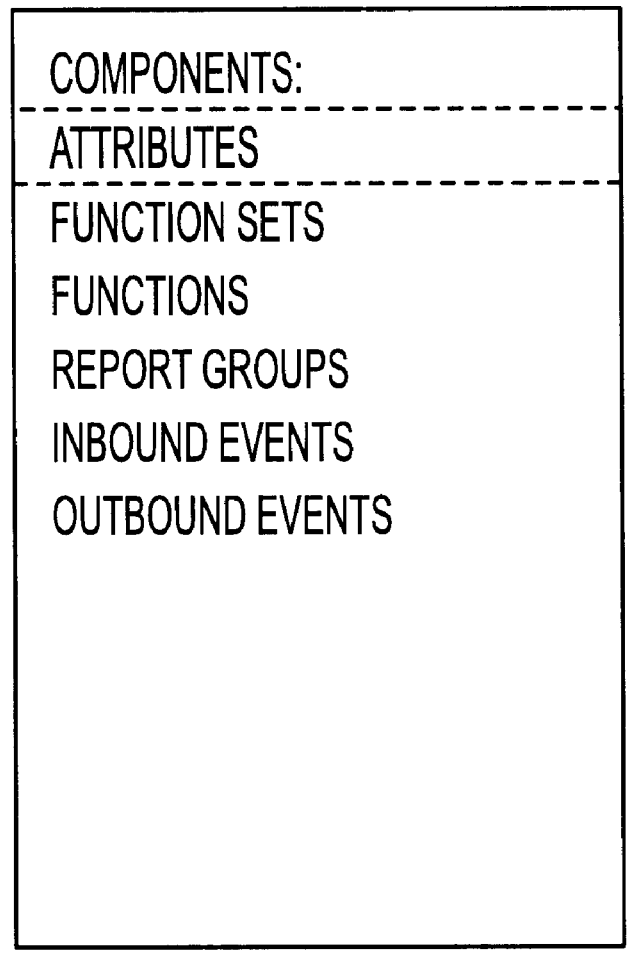
FIGS. 13(A) through 13(F) are diagrams illustrating windows (screens) appearing on a user's desktop for an example of a strategy component search in a decision management system, according to an embodiment of the present invention.

Referring now to FIG. 13(A), a window displays all the searchable strategy components in the system. For example, as illustrated in FIG. 13(A), the window displays attributes, function sets, functions, report groups, inbound events and outbound events. Of course, this is only a specific example, and different strategy components may be used in the decision management system and/or different strategy components may be searchable in the decision management system.

In FIG. 13(A), in this example, the user selects "attributes" as the strategy components to be searched. This selection is shown by dashed lines to indicate that "attributes" has been highlighted by the user.

Figure 14A:
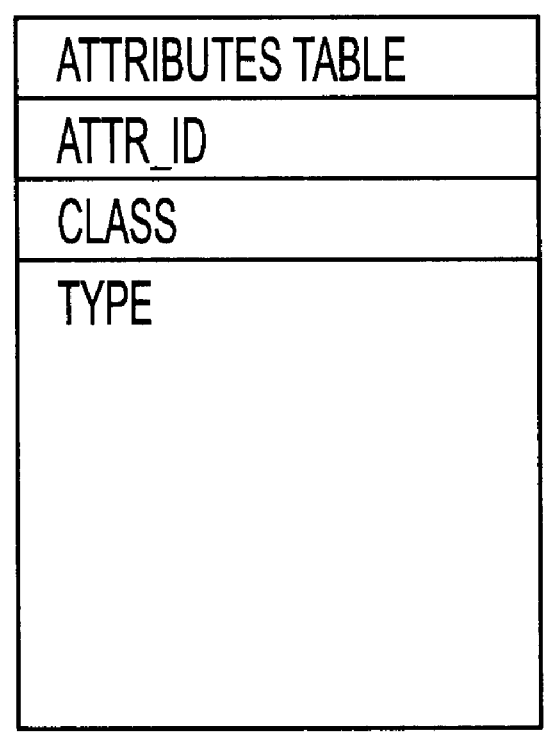

Since the attributes will be searched, the system then accesses an attribute table, as illustrated in FIG. 14(A). More specifically, FIG. 14(A) illustrates an attribute table having the fields of, for example, attribute identifier (ATTR_ID), the attribute class (CLASS) and the attribute type (TYPE). The system searches this attribute table and retrieves all attributes defined in the system.

Figure 13B:
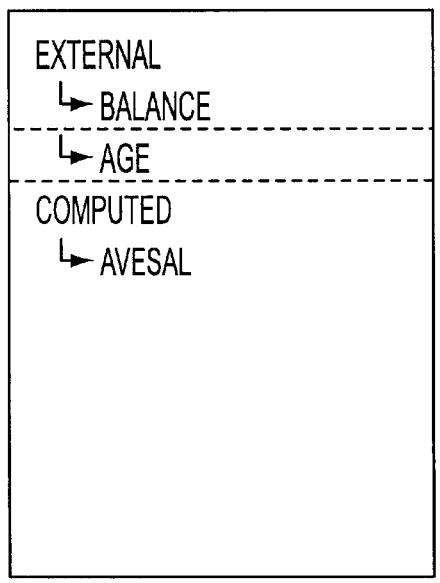

For example, FIG. 13(B) is a diagram illustrating a window displaying all the attributes in the system, as found from the attribute table. More specifically, the window display in FIG. 13(B) indicates that there are two types of attributes, an external type and a computed type. An external type attribute is, for example, an attribute passed into the decision management system from another system on a data extract. As indicated in FIG. 13(B), the external attributes in this example are balance and age. These attributes might represent an account balance and the age of a balance. A computed type attribute is, for example, an attribute calculated in the system using other attributes as inputs. As indicated in FIG. 13(B), the only computed attribute in the system is an average salary (AVESAL).

In FIG. 13(B), in this example, the user selects "age" to be searched. This selection is shown by dashed lines to indicate that, for example, "age" has been highlighted by the user.

Figure 14B:
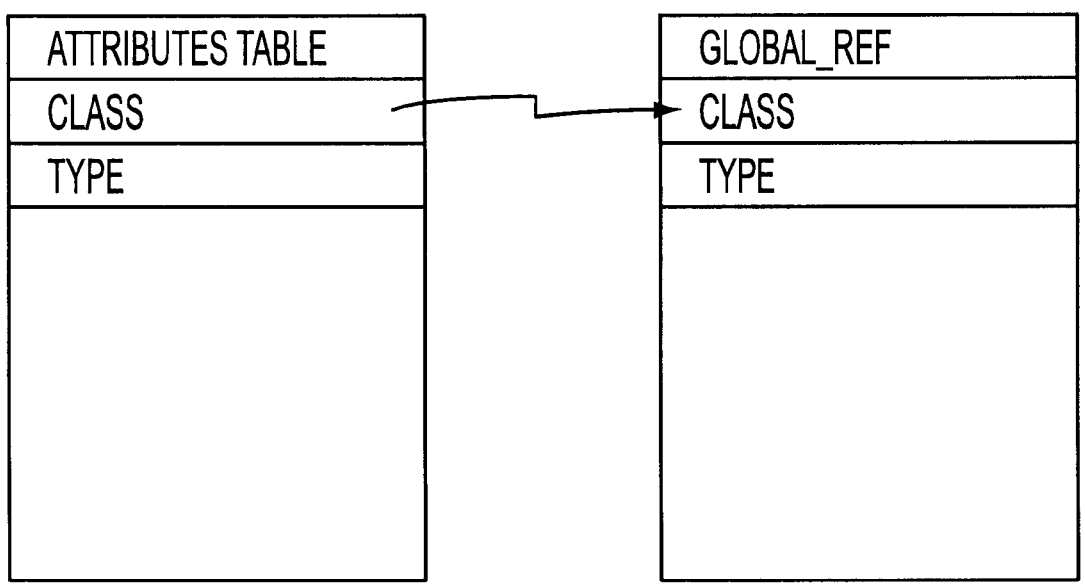

At this time, the system must present the selectable inquiries for external attributes. Therefore, as indicated by FIG. 14(B), the attribute table is linked to a global reference table (GLOBAL_REF) via CLASS. From this global reference table, the system retrieves inquiries for attributes of the external type. The system may define external attributes as TYPE "E" (for "external") of CLASS "A" (for "attribute").

Figure 13C:
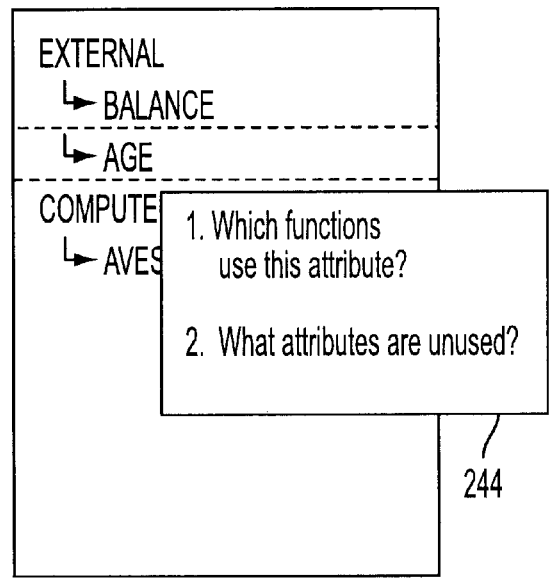

Then, as illustrated in FIG. 13(C), a pop-up menu 244 displays the various inquiries retrieved from the global reference table for CLASS=A and TYPE=E. For example, the following inquiries are displayed: "Which functions use this attribute?" and "What attributes are unused?" Of course, there are many different inquiries which could be listed. Changing the inquiries is easily accomplished in a central location by changing the data in the global reference table.

In this example, assume that the user selects the first inquiry "Which functions use this attribute?" Therefore, the system would now automatically display all functions which use the selected external attribute "age" distinguished by component type.

Figure 14C:
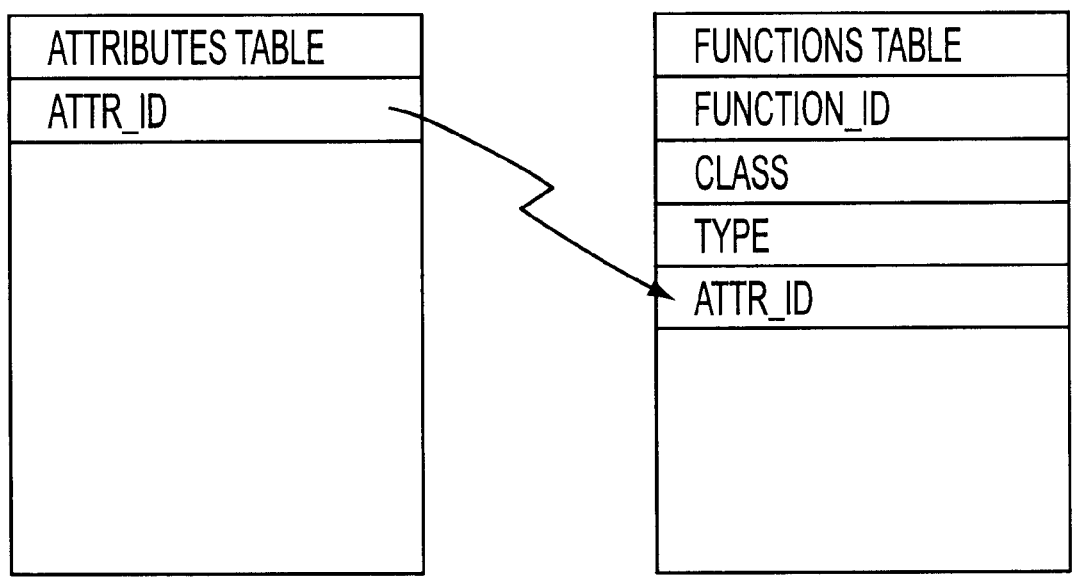

To accomplish this, as indicated by FIG. 14(C), the attributes table is linked to a functions table via the attribute ID (ATTR_ID). From the functions table, the system retrieves all functions (FUNCTION_ID's) that use the attribute "age" in accordance with the ATTR_ID for age.

Figure 13D:
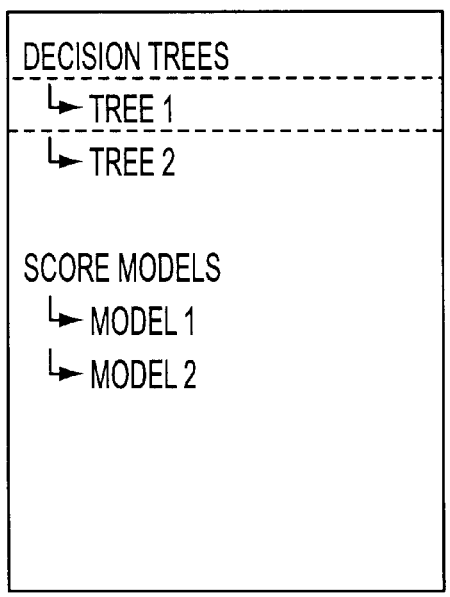

The result, as indicated in FIG. 13(D), is displayed in a window. For example, as illustrated in FIG. 13(D), the decision trees TREE 1 and TREE 2, and the score models MODEL 1 and MODEL 2, use the attribute "age." Here, it is assumed that the user selects TREE 1 for further searching, as indicated by the dashed lines in FIG. 13(D).

Figure 13E:
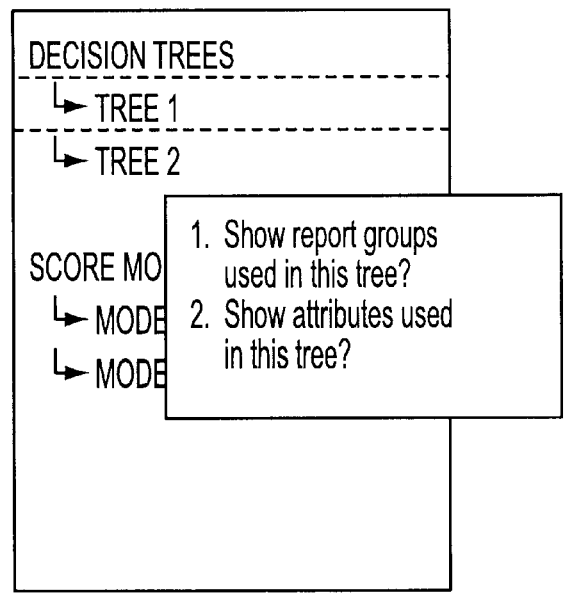

Then, as illustrated in FIG. 13(E), a pop-up window displays the various inquiries retrieved from the global reference table for CLASS=F and TYPE=T, where class F indicates a function, and type T indicates a tree. For example, the following inquiries are displayed: "Show report groups used in this tree" and "Show attributes used in this tree." Of course, there are many different inquiries which could be listed. Changing the inquiries is easily accomplished in a central location by changing the data in the global reference table.

In this example, assume that the user selects the first inquiry "Show report groups used in this tree." Therefore, the system would now automatically display all report groups which use the selected tree, TREE 1.

Figure 14D:
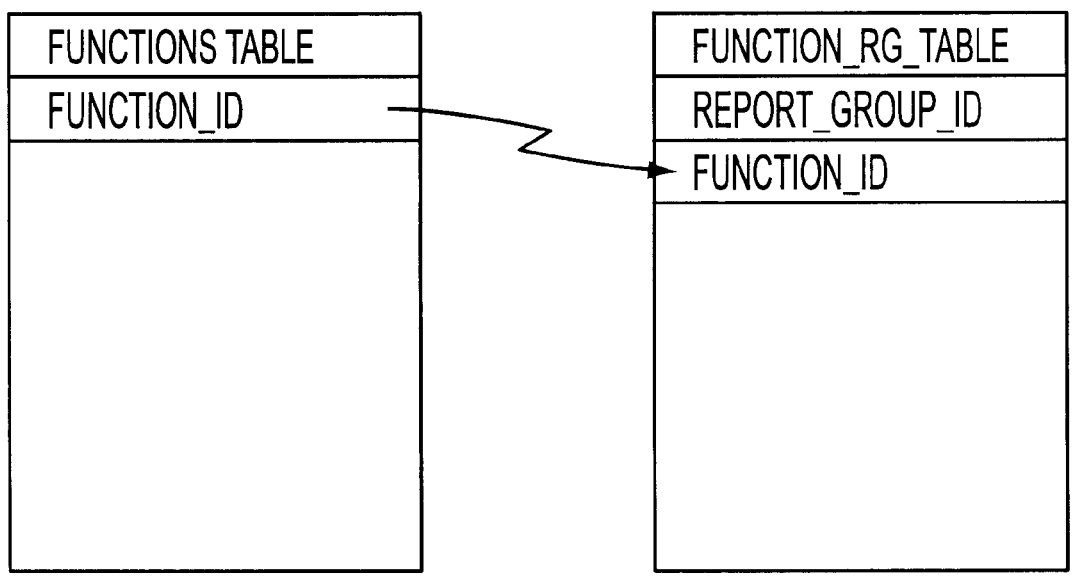

Therefore, as indicated by FIG. 14(D), the functions table is linked to a function report group table (FUNCTION_RG_TABLE) via the function ID (FUNCTION_ID). From the functions report group table, the system retrieves all report groups that use the function ID for tree 1.

Figure 13F:
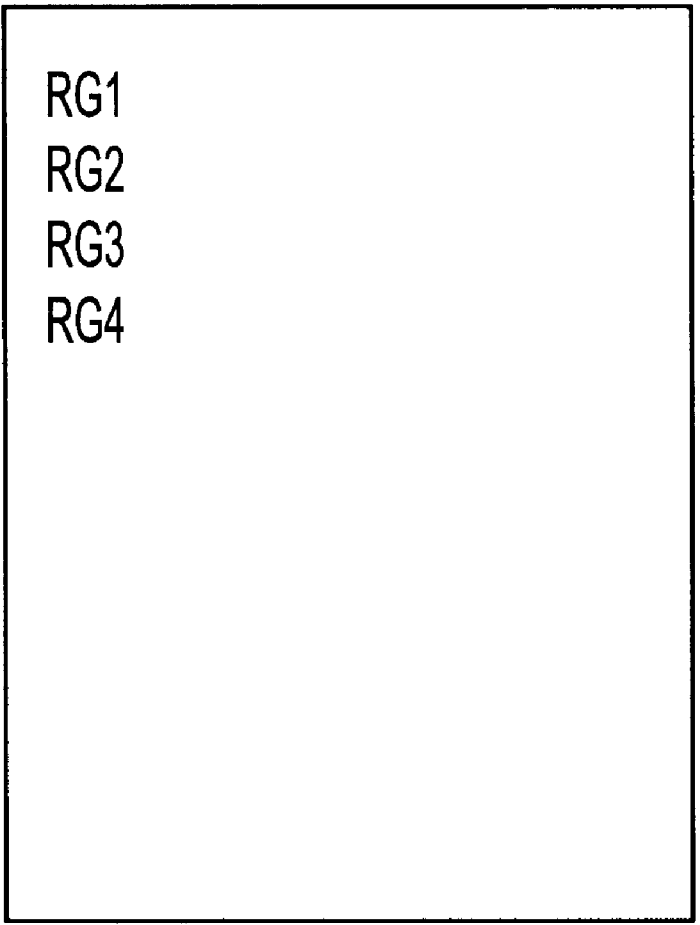

The result, as indicated in FIG. 13(F), is displayed in a window. For example, as illustrated in FIG. 13(F), the report groups RG1, RG2, RG3 and RG4, which are used in tree 1, are displayed.

As described above, the present invention searches for strategy components in a decision management system based upon their inter-relationships. A strategy component refers to any specific part of the strategy. For example, a strategy component could be a system, version, attributes, inbound event, outbound event, function, function set, segment, report instruction, continuous dimension, test group or report group.

Strategy components such as report groups are preferably defined at the system/version/segment level. Thus, the search would be conducted across a segment. For strategy components such as functions preferably defined at the system/version level, the search is for the system/version, and may be optionally narrowed, for example, to the current segment. When relevant, search results can be listed by strategy component type. For attributes and functions, the hierarchy and function class, respectively, are preferably provided.

As described above, each strategy component has a predetermined set of eligible searches defined by the inquiries for that strategy component. These searches and references to the technical strategy components to implement them are defined within a database table, such as the global reference table described above. As a result, the complexity of determining the implementation details of each search is removed from the end user, the complexity of the logic is reduced, and more direct control is provided to system users to expand search functionality to strategy components that are added in the future.

Preferably, a navigation command is provided to allow the end user to navigate to the individual selected strategy components for the purpose of editing, viewing or changing the properties of the strategy components. For example, a navigation command could be provided on the pop-up menus. Such a navigation command could be, for example, a GOTO command which can be selected to go to a selected strategy component. Moreover, the present invention is not limited to the use of pop-up menus, or placing navigation commands in pop-up menus. Instead, there are many controls and positions on the screen where navigation commands can be positioned. The use and implementation of a navigation command would be understandable by a person of skill in the art.

Therefore, via the use of a navigation command, if, for example, the user wants to delete a strategy component (such as an attribute), or change it, the user must first find the strategy component. Then, the user would automatically navigate to the found strategy component via a navigation command, and then make a change.

Moreover, as described above, inquiries are presented to the end user via pop-up "menus" on the end user's desktop, or screen display. In the various figures, the menus are shown as having a "box" shape. However, many different types of pop-up displays can be used, and the present invention is not limited to use of a pop-up display with a "box" shape, or any particular shape. Moreover, the present invention is not limited to inquiries which "pop-up." Instead, for example, the inquiries can be presented to the end user in a designated portion of the screen display and remain in view or be accessible even when the particular inquiries are not necessary for searching purposes.

As can be seen from the above, the present invention supports the identification of strategy components within a strategy. Moreover, a user can select any strategy component and execute inquiries of where the strategy components are used and referenced, and their inter-dependencies.

Moreover, as can be seen from the above, a decision management system can display search results in a list structure or in a tree structure, depending on the type of the strategy component. For example, the far right box in FIG. 11(F) displays report groups in a list structure, as the list structure is appropriate for this example where the report groups satisfying the search have no interrelationships therebetween. By contrast, FIG. 13(B) displays external attributes in a tree structure, as the tree structure appropriately shows BALANCE and AGE as being EXTERNAL attributes. Search results can be displayed/navigated in a top-down manner or a bottom-up manner.

In accordance with the above embodiments of the present invention, a search is performed for strategy components. Based on which inquiries are selected, the search can begin at different points in the strategy. Therefore, based on where the search begins in accordance with the selected inquiries, the search can be a top-down search or a bottom-up search. For example, if the search starts at the top of the strategy (i.e., at a general level) with respect to the location of a searched strategy component, then the search would be a top-down search. By contrast, if the search starts at the bottom of the strategy (i.e., at a detailed level) with respect to the location of a searched strategy component, then the search would be a bottom-up search.

As can be seen from the above, the present invention allows strategy components of a strategy to be found. Of course, if the searched strategy components do not exist, the user would be notified that no strategy components were found. Therefore, the present invention provides the ability to identify strategy components not used in a strategy. For example, assume that the decision management includes decisions as a type of strategy component. Then, a strategy might include 50 trees, each using 100 decisions from a pool of decisions. The present invention would allow a search to be performed to determine if a specific decision from the pool of decisions is being used in the strategy. If the decision is not being used, the user is notified that the decision was not found/referenced anywhere in the overall strategy.

Figure 15:
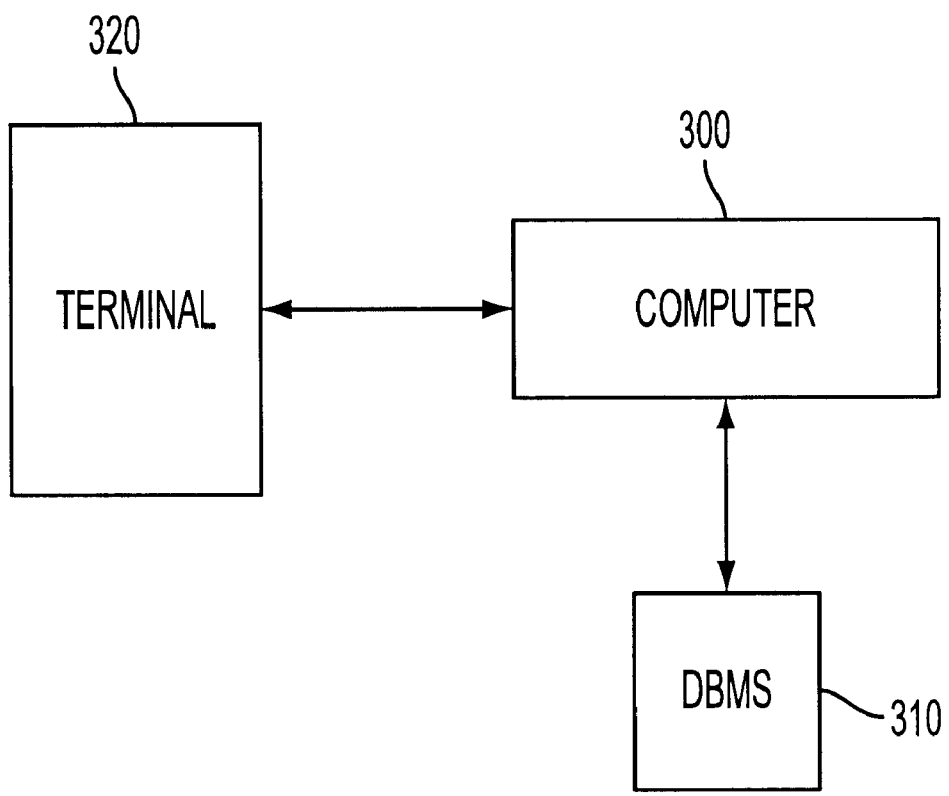
FIG. 15 is a diagram illustrating a simplified hardware architecture of a decision management system, according to an embodiment of the present invention.

FIG. 15 is a diagram illustrating a simplified hardware architecture of a decision management system, according to an embodiment of the present invention. Referring now to FIG. 15, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. There are many different types of hardware configurations, including many different types of client/server architectures, which can be used. Such hardware configurations would be understood by a person of skill in the art.

Figure 16:
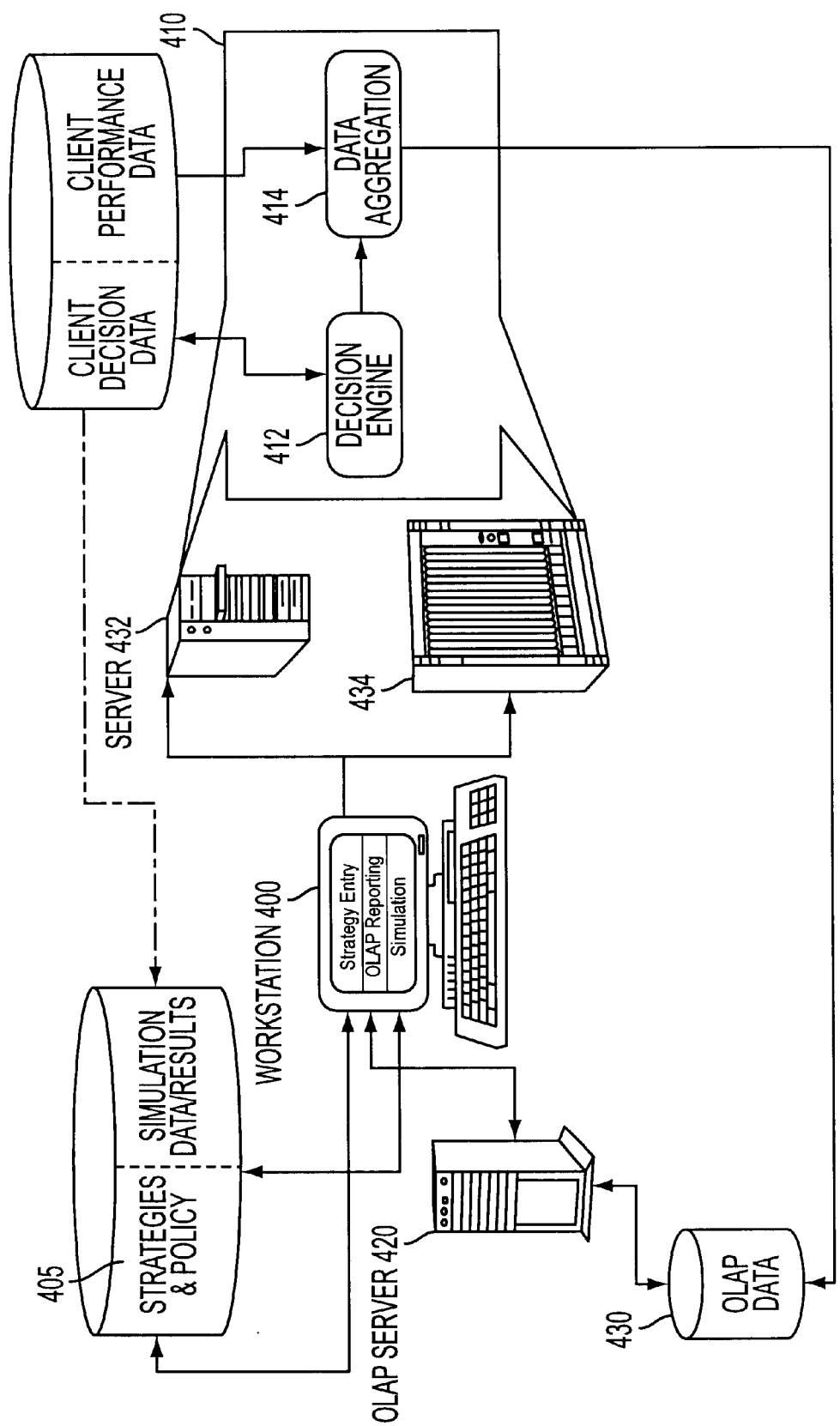
FIG. 16 is a diagram illustrating a more detailed hardware architecture of a decision management system, according to an embodiment of the present invention.

For example, FIG. 16 is a diagram illustrating a more detailed hardware architecture of a decision management system, according to an embodiment of the present invention. Referring now to FIG. 16, a workstation 400 provides a centralized user interface through which a strategy analyst, or system user, can control the system. The primary purpose of workstation 400 is to enable the entry, maintenance and propagation of decision strategies and simulation parameters to a decision engine/data aggregation platform 410 which includes a decision engine 412 and a data aggregation component 414. These strategies reside in a relational data model 405 while they are being edited, maintained, and selected for simulation/production. Workstation 400 also provides access to OLAP analysis and reporting systems, possibly via an OLAP server 420, and consistently using an OLAP database 430. A server 432 and a mainframe 434 typically run different processing modes, and provide the processing power for decision engine/data aggregation platform 410.

It is within workstation 400 and database 405 that the software for implementing the present invention described herein for searching for components would typically reside.

Decision engine 412 deploys the business decisioning rules and simulation parameters entered on workstation 400 against client data. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite inquiry requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system as described above is embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

According to the above embodiments of the present invention, a decision management system includes a strategy creator and a strategy searcher. The strategy creator is an environment in which to create a decision management strategy formed of a plurality of strategy components. The strategy searcher automatically searches for a respective strategy component by examining the relationships between data comprising the strategy So identify where the strategy component is being used in the strategy. A computer, such as computer 300 in FIG. 15, which performs various of the above-described operations, could support such strategy creator and strategy searcher applications simultaneously as subsystems of a larger application and/or independent applications.

The present invention relates to a software based decision management system. Software based decision-management systems are systems which apply strategies to determine actions to be taken, monitor performance based on the taken actions, and refine the strategies in accordance with the monitored performance. The strategies that are applied and refined by a decision management system can be referred to as "decision management strategies."

Therefore, according to the above embodiments of the present invention, a decision management system applies a decision management strategy to determine actions to be taken, monitors performance based on the taken actions, and refines the strategy in accordance with the monitored performance. Moreover, the decision management system automatically searches for a respective strategy component through examining inter-dependencies within the strategy to identify where the strategy component is being used in the strategy. Here, the term "automatically" indicates that the search is performed by a computer or computer application. For example, as described above, the decision management system searches for strategy components by automatically tracing linked tables in a relational data model. The various data maintained by the relational data model and referenced by the linked tables is stored in a computer readable form which is not typically understood or searched by humans without detailed technical knowledge of the underlying software, hardware and infrastructure. However, such searching through the computer readable data is easily performed by a computer via well-known software techniques as created and applied by application developers skilled in the art.

According to the above embodiments of the present invention, a decision management system searches for strategy components by analyzing a relational data model used for implementing/storing the strategy. For example, the various linked tables described herein are part of a relational data model for implementing the strategy. However, the present invention is not limited to this specific data model, and various other data models can be used to implement the strategy and to search for strategy components. Moreover, a data model is not limited to the use of linked tables, and many other data models can be used.

According to the above embodiments of the present invention, a search is performed to determine where strategy components are being used in a strategy. Here, the term "used" includes the strategy component being referenced in the strategy.

Various of the above embodiments of the present invention describe a user's desktop. The concept of a desktop is well-known in the art, and generally refers to the primary window in an application that supports multiple windows (screens).

The many features and advantages of the invention are apparent from the detailed specification and, thus, it is intended by the appended claims to cover all such features and advantages of the invention which fall within the true spirit and scope of the invention. Further, since numerous modifications and changes will readily-occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented decision management process comprising:
   providing a decision management strategy formed of a plurality of strategy components; and
   automatically searching for a respective strategy component through the strategy to identify where the respective strategy component is being used in the strategy, to thereby allow navigation to the respective strategy component for viewing or changing properties of the respective strategy component by an end user of the process.

2. A process as in claim 1, wherein said automatically searching automatically searches for the respective strategy component through the strategy to determine the strategy component's inter-relationships in the strategy.

3. A process as in claim 1, further comprising:
   automatically presenting a plurality of selectable inquiries to an end user of the process, wherein said automatically searching searches for the respective strategy component in accordance with a respective inquiry of the plurality of selectable inquiries selected by the end user.

4. A process as in claim 3, wherein said automatically presenting presents the plurality of inquiries to the end user in a pop-up display on a screen display.

5. A process as in claim 3, wherein the presented plurality of inquiries are context sensitive to correspond to the respective strategy component.

6. A process as in claim 3, wherein the searching is a top-down search or a bottom-up search in accordance with the inquiry selected by the end user and whether the search is to be initiated from a general or detailed context.

7. A process as in claim 1, wherein said automatically searching comprises:
   searching for a first strategy component through the strategy in accordance with a first inquiry selected by an end user of the process, to determine a second strategy component satisfying the selected inquiry; and
   searching for the second strategy component through the strategy in accordance with a second inquiry selected by the end user.

8. A process as in claim 1, wherein said automatically searching searches for the respective strategy component through the strategy by analyzing a data model for implementing the strategy.

9. A process as in claim 1, wherein said automatically searching searches for the respective strategy component through the strategy by analyzing linked tables of a relational data model for implementing the strategy.

10. A process as in claim 1, wherein said automatically searching searches for the respective strategy component through the strategy via a global reference table linking tables of a relational data model for implementing the strategy.

11. A process as in claim 10, wherein the global reference table includes fields for linking component classes and component types in linked tables of a relational data model for implementing the strategy.

12. A process as in claim 3, wherein said automatically searching searches for the respective strategy component through the strategy via a global reference table linking tables of a relational data model for implementing the strategy.

13. A process as in claim 12, wherein the global reference table includes fields for linking component classes and component types in linked tables of a relational data model for implementing the strategy.

14. A process as in claim 1, wherein the strategy components include at least one of the group consisting of a system, version, attribute, inbound event, outbound event, function, function set, segment, report instruction, continuous dimension, test group and report group, of the strategy.

15. A computer-implemented decision management process comprising:
   providing a decision management strategy formed of a plurality of strategy components;
   selecting a strategy component of the plurality of strategy components;
   automatically presenting a plurality of selectable inquiries to an end user of the process, the plurality of selectable inquiries relating to the type and location of the selected strategy component in the strategy;
   selecting a respective inquiry of the plurality of selectable inquiries by the end user; and
   automatically searching for a respective strategy component through the strategy in accordance with the selected inquiry to identify where the respective strategy component is being used in the strategy, to thereby allow navigation to the respective strategy component for viewing or changing properties of the respective strategy component by the end user.

16. A process as in claim 15, wherein said automatically searching searches for the respective strategy component through the strategy by analyzing linked tables of a relational data model for implementing the strategy.

17. A process as in claim 15, wherein the strategy components include at least one of the group consisting of a system, version, attribute, inbound event, outbound event, function, function set, segment, report instruction, continuous dimension, test group and report group, of the strategy.

18. A computer-implemented decision management process comprising:

providing a decision management strategy formed of a plurality of strategy components;

selecting a first strategy component;

automatically presenting a first group of selectable inquiries to an end user of the process, the inquiries of the first group being context sensitive to thereby correspond to the first strategy component;

selecting a respective inquiry of the first group of selectable inquiries by the end user;

automatically searching for the first strategy component through the strategy in accordance with the selected inquiry of the first group of selectable inquiries, to determine a second strategy component satisfying the selected inquiry;

automatically presenting a second group of selectable inquiries to the end user of the process, the inquiries of the second group being context sensitive to thereby correspond to the second strategy component;

selecting a respective inquiry of the second group of selectable inquiries by the end user; and automatically searching for the second strategy component through the strategy in accordance with the selected inquiry of the second group of selectable inquiries, to thereby allow navigation to the second strategy component for viewing or changing properties of the second strategy component by the end user.

19. A process as in claim 18, wherein said automatically searching for the first strategy component searches for the first strategy component through the strategy by analyzing linked tables of a relational data model for implementing the strategy, and said automatically searching for the second strategy component searches for the second strategy component through the strategy by analyzing linked tables of a relational data model for implementing the strategy.

20. A process as in claim 18, wherein the strategy components include at least one of the group consisting of a system, version, attribute, inbound event, outbound event, function, function set, segment, report instruction, continuous dimension, test group and report group, of the strategy.

21. A process comprising:

providing a decision management system which applies a strategy to determine actions to be taken, monitors performance based on the taken actions, and refines the strategy in accordance with the monitored performance, the strategy being formed of a plurality of strategy components; and automatically searching for a respective strategy component through the strategy to identify where the respective strategy component is being used in the strategy, to thereby allow navigation to the respective strategy component for viewing or changing properties of the respective strategy component by an end user of the process.

22. A process as in claim 21, further comprising:

automatically presenting a plurality of selectable inquiries to an end user of the decision management system, wherein said automatically searching searches for the respective strategy component in accordance with a respective inquiry of the plurality of selectable inquiries selected by the end user.

23. A process as in claim 22, wherein said automatically presenting presents the plurality of inquiries to the end user in a pop-up display on a screen display.

24. A process as in claim 22, wherein the presented plurality of inquiries are context sensitive to correspond to the respective strategy component.

25. A computer-implemented decision management system comprising:

means for providing a decision management strategy formed of a plurality of strategy components; and means for automatically searching for a respective strategy component through the strategy to identify where the respective strategy component is being used in the strategy, to thereby allow navigation to the respective strategy component for viewing or changing properties of the respective strategy component by an end user of the system.

26. A computer-implemented decision management system comprising:

a strategy creator creating a decision management strategy formed of a plurality of strategy components; and a strategy searcher automatically searching for a respective strategy component through the strategy to identify where the respective strategy component is being used in the strategy, to thereby allow navigation to the respective strategy component for viewing or changing properties of the respective strategy component by an end user of the system.

27. A computer-implemented decision management process comprising:

providing a decision management strategy formed of a plurality of strategy components; and automatically searching for a respective strategy component through the strategy to identify where the respective strategy component is not being used in the strategy, to thereby allow navigation to the respective strategy component for viewing or changing properties of the respective strategy component by an end user of the process.

28. A process as in claim 27, further comprising:

automatically presenting a plurality of selectable inquiries to an end user of the process, wherein said automatically searching searches for the respective strategy component in accordance with a respective inquiry of the plurality of selectable inquiries selected by the end user.

29. A process as in claim 27, wherein said automatically searching searches for the respective strategy component through the strategy by analyzing a data model for implementing the strategy.

30. A process as in claim 27, wherein said automatically searching searches for the respective strategy component through the strategy by analyzing linked tables of a relational data model for implementing the strategy.

31. A process as in claim 1, further comprising:

displaying a result of said automatically searching to an end user of the process.

32. A process as in claim 15, further comprising:

displaying a result of said automatically searching to the end user.

33. A process as in claim 18, further comprising:

displaying a result of said automatically searching to the end user.

34. A process as in claim 21, further comprising:

displaying a result of said automatically searching to an end user of the process.

35. A decision management system as in claim 26, further comprising:

means for displaying a result of the searching by the strategy searcher.

36. A process as in claim 27, further comprising:

displaying a result of said automatically searching to an end user of the process.

* * * * *

UNITED STATES PATENT AND TRADEMARK OFFICE
CERTIFICATE OF CORRECTION

PATENT NO.     : 6,609,120 B1
DATED          : August 19, 2003
INVENTOR(S)    : Laurence Honarvar et al.

It is certified that error appears in the above-identified patent and that said Letters Patent is hereby corrected as shown below:

<u>Column 4,</u>
Line 11, delete "." after "divide".
Line 18, delete "." after "155".

<u>Column 7,</u>
Line 41, change "CLAP" to -- OLAP --.

Signed and Sealed this

Thirteenth Day of January, 2004

JON W. DUDAS
*Acting Director of the United States Patent and Trademark Office*